United States Patent
Zhao et al.

(10) Patent No.: US 11,898,922 B2
(45) Date of Patent: Feb. 13, 2024

(54) TORQUE SENSOR, ROBOT, AND TORQUE CALCULATION METHOD

(71) Applicant: KABUSHIKI KAISHA YASKAWA DENKI, Fukuoka (JP)

(72) Inventors: Fei Zhao, Fukuoka (JP); Kumiko Toma, Fukuoka (JP); Takehito Soga, Fukuoka (JP); Kenichi Sadakane, Fukuoka (JP); Yasushi Yoshida, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 23 days.

(21) Appl. No.: 17/720,098

(22) Filed: Apr. 13, 2022

(65) Prior Publication Data

US 2022/0244117 A1    Aug. 4, 2022

Related U.S. Application Data

(63) Continuation-in-part of application No. PCT/JP2019/041722, filed on Oct. 24, 2019.

(51) Int. Cl.
G01L 3/08 (2006.01)
B25J 13/08 (2006.01)
G01L 5/00 (2006.01)

(52) U.S. Cl.
CPC ............... G01L 3/08 (2013.01); B25J 13/085 (2013.01); G01L 5/0028 (2013.01)

(58) Field of Classification Search
CPC .. G01L 3/08; G01L 5/0028; G01L 3/14; B25J 13/085
See application file for complete search history.

(56) References Cited

U.S. PATENT DOCUMENTS 7,490,524 B2 * 2/2009 Ohsato .................... G01L 5/162
73/862.629
8,965,577 B2 * 2/2015 Arimitsu ................ G01B 11/16
702/41
(Continued)

FOREIGN PATENT DOCUMENTS

JP    S62-276424 A    12/1987
JP    H08-035895 A    2/1996
(Continued)

OTHER PUBLICATIONS

International Search Report dated Jan. 14, 2020 for WO 2021/079464 A1 (11 pages).

Primary Examiner — Freddie Kirkland, III
(74) Attorney, Agent, or Firm — Venjuris, P.C.

(57) ABSTRACT

A torque sensor includes: a strain body; and an optical sensor configured to detect a deformation of the strain body. The strain body includes an outer peripheral portion having a ring shape, and an inner peripheral portion of which at least a part is disposed inside the outer peripheral portion in a radial direction. The optical sensor includes a scale fixed to one of the outer peripheral portion and the inner peripheral portion, and disposed between the outer peripheral portion and the inner peripheral portion, and a detector fixed to a remaining one of the outer peripheral portion and the inner peripheral portion, and disposed to face the scale between the outer peripheral portion and the inner peripheral portion.

21 Claims, 16 Drawing Sheets

(56) References Cited

U.S. PATENT DOCUMENTS

| | | | |
|---|---|---|---|
| 10,067,019 B2* | 9/2018 | Bradford | B25J 19/0095 |
| 10,201,901 B2* | 2/2019 | Sato | B25J 9/1674 |
| 10,350,767 B2* | 7/2019 | Nagata | B25J 13/085 |
| 10,583,570 B2* | 3/2020 | Ogata | B25J 19/063 |
| 10,775,250 B2* | 9/2020 | Okada | G01L 3/106 |
| 11,187,600 B2* | 11/2021 | Akiba | G01L 5/0061 |
| 11,215,518 B2* | 1/2022 | Endo | G01L 5/1627 |
| 11,402,285 B2* | 8/2022 | Ogawa | G01D 5/26 |
| 2010/0312394 A1* | 12/2010 | Arimitsu | G01B 11/16 |
| | | | 702/41 |
| 2016/0221193 A1* | 8/2016 | Sato | B25J 13/085 |
| 2018/0099421 A1* | 4/2018 | Ogata | G01L 5/009 |
| 2019/0064015 A1 | 2/2019 | Wang et al. | |
| 2019/0310151 A1 | 10/2019 | Nagura | |
| 2019/0389076 A1* | 12/2019 | Endo | B25J 19/02 |
| 2020/0238537 A1* | 7/2020 | Nagura | G01L 1/04 |

FOREIGN PATENT DOCUMENTS

| | | |
|---|---|---|
| JP | 2004-219341 A | 8/2004 |
| JP | 2014-219341 A | 8/2004 |
| JP | 2010-281635 A | 12/2010 |
| JP | 2012-189516 A | 10/2012 |
| JP | 2019-074421 T | 5/2019 |
| JP | 2019-174472 A | 10/2019 |
| WO | 2019/021442 A1 | 1/2019 |

* cited by examiner

TORQUE SENSOR, ROBOT, AND TORQUE CALCULATION METHOD

CROSS-REFERENCE TO RELATED APPLICATIONS

This application is a continuation-in-part application of International Patent Application No. PCT/JP2019/041722, filed on Oct. 24, 2019, the disclosure of which is incorporated herein in its entirety by reference.

TECHNICAL FIELD

The present disclosure relates to a torque sensor, a robot, and a torque calculation method.

BACKGROUND

Japanese Laid-Open Patent Publication No. 2012-189516 discloses a torque sensor including a first member, a second member having a rotational relationship relative to the first member, a connection member that connects the first member and the second member to each other, a scale provided on the first member, and a detection head provided on the second member to detect position information from the scale.

SUMMARY

In the conventional technology described above, the first member and the second member are axially connected to each other by the connection member, and the scale and the detection head are arranged in the space between the first and second members. Thus, the axial dimension increases, which may cause the increase in size of the torque sensor.

The present disclosure has been made in view of the problem, and an object thereof is to provide a torque sensor, a robot, and a torque calculation method, which may implement the downsizing.

According to an aspect of the present disclosure, a torque sensor includes: a strain body (e.g., a distortion element); and a plurality of optical sensors configured to detect a deformation of the strain body. The strain body includes a ring-shaped outer peripheral portion, and an inner peripheral portion of which at least a part is disposed inside the outer peripheral portion in a radial direction. Each of the optical sensors includes a scale fixed to one of the outer peripheral portion and the inner peripheral portion, and disposed between the outer peripheral portion and the inner peripheral portion, and a detector fixed to a remaining one of the outer peripheral portion and the inner peripheral portion, and disposed to face the scale between the outer peripheral portion and the inner peripheral portion.

According to another aspect of the present disclosure, a robot includes the torque sensor described above, at a tip of an arm.

According to yet another aspect of the present disclosure, a robot includes a torque sensor at a tip of an arm. The torque sensor includes a strain body, and a sensor configured to detect a deformation of the strain body. The strain body includes a ring-shaped outer peripheral portion, an inner peripheral portion of which at least a part is disposed inside the outer peripheral portion in a radial direction, and a protrusion provided in the outer peripheral portion, and protruding from an end of the inner peripheral portion on axial one side, toward the axial one side. The torque sensor of the robot further includes a seal mechanism disposed between the protrusion and a member to which the outer peripheral portion or the inner peripheral portion is fixed.

According to yet another aspect of the present disclosure, a torque calculation method uses a torque sensor including a strain body, and a plurality of optical sensors arranged at a plurality of positions of the strain body in a circumferential direction, and configured to detect a deformation of the strain body. The method includes: acquiring outputs of the plurality of optical sensors; and adding the outputs of the plurality of optical sensors, and calculating a torque based on a result of the addition.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

Hereinafter, an embodiment of the present disclosure will be described with reference to the drawings.

(1. Overall Configuration of Torque Sensor)

Figure 1:
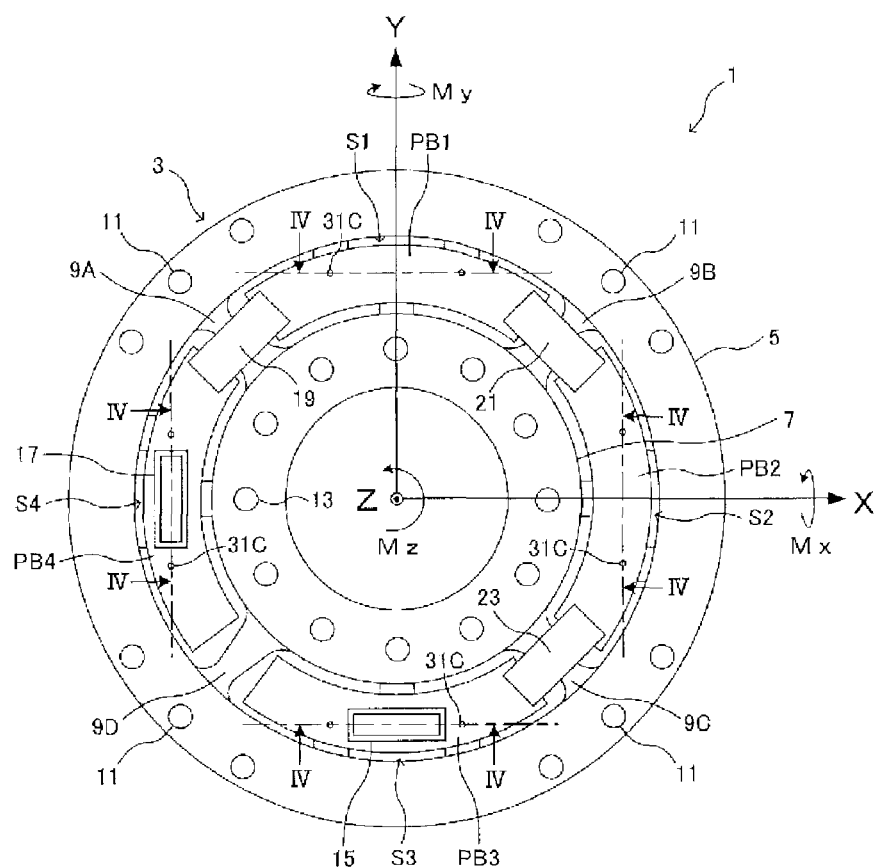
FIG. 1 is a plan view of a torque sensor when viewed from the positive direction side of the Z axis.

First, with reference to FIGS. 1 and 2, an example of an overall configuration of a torque sensor 1 according to an embodiment will be described. FIG. 1 is a plan view of the torque sensor 1 when viewed from the positive direction side of the Z axis, and FIG. 2 is a side view of the torque sensor 1 when viewed from the negative direction side of the Y axis.

Figure 2:
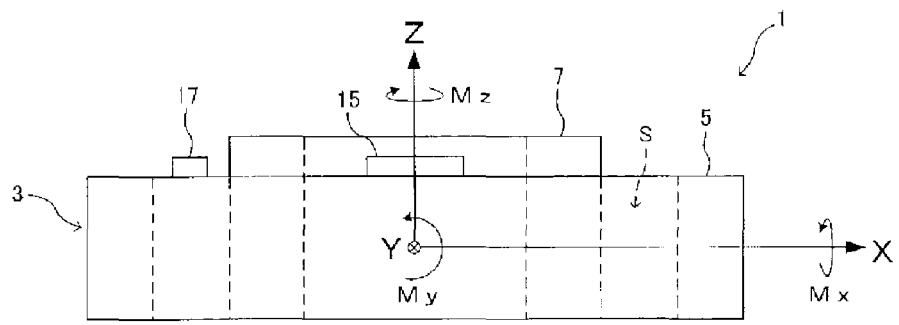
FIG. 2 is a side view of the torque sensor when viewed from the negative direction side of the Y axis.

As illustrated in FIGS. 1 and 2, the torque sensor 1 includes a strain body 3 that is deformed by an external force. The strain body 3 is made of a relatively lightweight metal. The strain body 3 includes a ring-shaped outer peripheral portion 5, a ring-shaped inner peripheral portion 7 disposed inside the outer peripheral portion 5 in the radial direction and having a diameter smaller than that of the outer peripheral portion 5, and a plurality of (four in this example) connection units 9A to 9D that connect the outer peripheral portion 5 and the inner peripheral portion 7 to each other. The inner peripheral portion 7 may have a solid structure (e.g., a disk-shaped member), instead of the hollow structure. Further, while the entire inner peripheral portion 7 is disposed inside the outer peripheral portion 5 in the radial direction, the present disclosure is not limited thereto. For example, only a part of the inner peripheral portion 7 may be disposed inside the outer peripheral portion 5 in the radial direction.

As illustrated in FIG. 1, the outer peripheral portion 5 and the inner peripheral portion 7 are arranged concentrically in the radial direction about the Z axis. A plurality of (12 in this example) bolt holes 11 is formed in the outer peripheral portion 5, such that a plurality of fastening bolts (not illustrated) is inserted through the bolt holes 11 to fix the outer peripheral portion 5 to an external device (e.g., a robot arm, an end effector, a speed reducer, or a motor). The bolt holes 11 are arranged intensively in the vicinity of each of the connection units 9A to 9D, so as to be denser at the position that corresponds to each of the connection units 9A to 9D in the circumferential direction around the Z axis, than those at the position that does not correspond to each of the connection units 9A to 9D. A plurality of (12 in this example) bolt holes 13 is formed in the inner peripheral portion 7, such that a plurality of fastening bolts (not illustrated) is inserted through the bolt holes 13 to fix the inner peripheral portion 7 to an external device (e.g., a robot arm, an end effector, a speed reducer, or a motor). The bolt holes 13 are arranged at substantially equal angular intervals (intervals of 30° in this example) in the circumferential direction around the Z axis.

The bolt holes 13 may also be arranged intensively in the vicinity of each of the connection units 9A to 9D, similarly to the bolt holes 11. Further, the bolt holes 11 may be arranged at substantially equal angular intervals in the circumferential direction around the Z axis, similarly to the bolt holes 13.

As illustrated in FIG. 2, the thickness of the inner peripheral portion 7 in the Z-axis direction is larger than the thickness of the outer peripheral portion 5. The outer peripheral portion 5 and the inner peripheral portion 7 are arranged, such that the bottom surfaces thereof (the end surfaces thereof on the negative direction side of the Z axis) are substantially flush with each other, and a part of the inner peripheral portion 7 protrudes from the outer peripheral portion 5 toward the positive direction side of the Z axis. A part of the inner peripheral portion 7 may protrude from the outer peripheral portion 5 toward the negative direction side of the Z axis, or may protrude toward both the positive direction side and the negative direction side of the Z axis. Further, the thicknesses of the outer peripheral portion 5 and the inner peripheral portion 7 may be substantially the same, or the thickness of the inner peripheral portion 7 may be smaller than the thickness of the outer peripheral portion 5.

The connection units 9A to 9D are arranged at substantially equal angular intervals (intervals of 90° in this example) in the circumferential direction around the Z axis, in the space S between the outer peripheral portion 5 and the inner peripheral portion 7 (see, e.g., FIG. 2). The connection units 9A to 9D connect the outer peripheral portion 5 and the inner peripheral portion 7 to be relatively rotatable around the Z axis by a minute amount corresponding to the magnitude of a torque to be detected by the torque sensor 1 (a torsional moment Mz around the Z axis). In the following, for the convenience of description, in the space S, the space between the connection units 9A and 9B will be referred to as S1, the space between the connection units 9B and 9C will be referred to as S2, the space between the connection units 9C and 9D will be referred to as S3, and the space between the connection units 9D and 9A will be referred to as S4.

The number and the arrangement of the connection units are not limited to those described above, as long as the outer peripheral portion 5 and the inner peripheral portion 7 may be connected to each other to have a predetermined rigidity.

As illustrated in FIG. 1, a plurality of (four in this example) substrates PB1 to PB4 is arranged in the space S between the outer peripheral portion 5 and the inner peripheral portion 7. Each of the substrates PB1 to PB4 includes a plurality of substrates, and thus, is configured as a set of substrates (see, e.g., FIG. 4). The substrates PB1 to PB4 are arranged in the plurality of spaces S1 to S4, respectively, among the plurality of connection units 9A to 9D in the circumferential direction around the Z axis. That is, the substrate PB1 is disposed in the space S1, the substrate PB2 is disposed in the space S2, the substrate PB3 is disposed in the space S3, and the substrate PB4 is disposed in the space S4. The substrates PB3 and PB4 are provided with external connectors 15 and 17, respectively, for performing an input of a power supply or transmission/reception of signals with respect to an external device.

The circumferentially adjacent substrates, in this example, the substrates PB4 and PB1, the substrates PB1 and PB2, and the substrates PB2 and PB3 are electrically connected by coupling units 19, 21, and 23, respectively, across the connection units 9A, 9B, and 9C. The coupling units 19, 21, and 23 are, for example, flexible boards (flexible printed circuits; FPC). Further, the coupling units are not limited as long as the substrates may be connected to each other for transmitting/receiving signals, and for example, lead wires, cables, and connectors other than FPC may be used.

In the present embodiment, of the axes perpendicular to the Z axis, the axis passing through the substantially center position of the substrate PB2 in the circumferential direction (the direction that bisects the angular interval of the connection units 9B and 9C) will be referred to as an X axis, and the axis perpendicular to the X axis, that is, the direction passing through the substantially center position of the substrate PB1 in the circumferential direction (the direction that bisects the angular interval of the connection units 9A and 9B) will be referred to as a Y axis.

(2. Configuration of Strain body)

Figure 3:
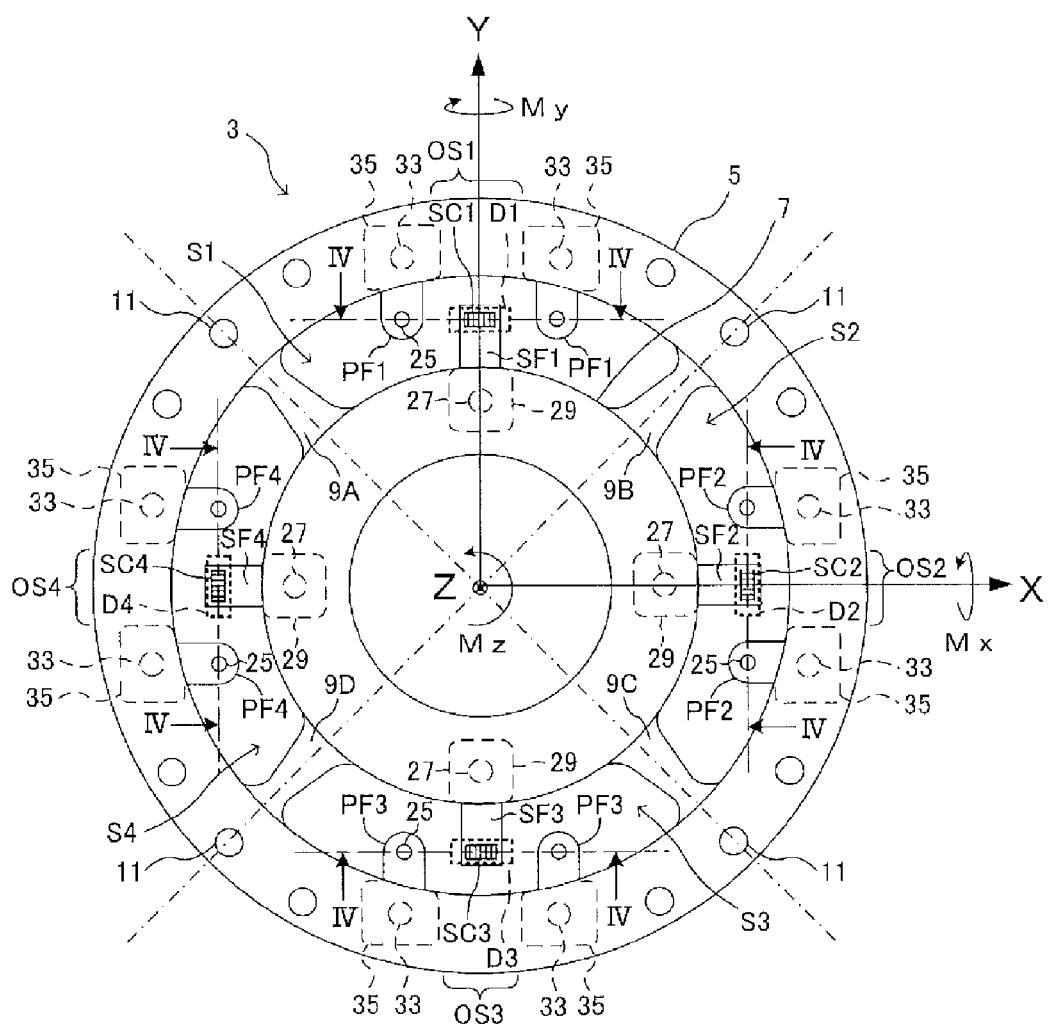
FIG. 3 is a plan view of a strain body when viewed from the positive direction side of the Z axis.

Next, an example of the configuration of the strain body 3 will be described with reference to FIG. 3. FIG. 3 is a plan view of the strain body 3 when viewed from the positive direction side of the Z-axis. FIG. 3 illustrates a state where, for example, the substrates PB1 to PB4 and the coupling units 19, 21, and 23 are removed from the torque sensor 1 illustrated in FIG. 3. Further, for preventing the complication in illustration, FIG. 3 omits the illustration of the bolt holes 13 of the inner peripheral portion 7. Further, FIG. 3 indicates detection units D1 to D4 provided on the substrates PB1 to PB4 in dashed lines, in order to represent the positional relationship with scales SC1 to SC4.

As illustrated in FIG. 3, the strain body 3 includes the outer peripheral portion 5, the inner peripheral portion 7, and the connection units 9A to 9D, and the connection units 9A to 9D are arranged at intervals of about 90° in the circumferential direction. The inner peripheral portion 7 includes a plurality of (four in this example) scale fixing units SF1 to SF4 that protrudes radially outward in the space S. The scale fixing units SF1 to SF4 are arranged at intervals of about 90° in the circumferential direction. The scales SC1 to SC4 are fixed onto the upper surfaces of the scale fixing units SF1 to SF4, respectively, by, for example, screws (not illustrated). Although not illustrated, each of the scales SC1 to SC4 includes a plurality of reflection slits arranged in the circumferential direction.

The scale fixing unit SF1 protrudes in the positive direction of the Y axis, and the scale SC1 is disposed at the intermediate position between two fixing positions of the substrate PB1 (pin holes 25 of substrate fixing units PF1 to be described later) in the circumferential direction. The scale fixing unit SF2 protrudes in the positive direction of the X axis, and the scale SC2 is disposed at the intermediate position between two fixing positions of the substrate PB2 (pin holes 25 of substrate fixing units PF2 to be described later) in the circumferential direction. The scale fixing unit SF3 protrudes in the negative direction of the Y axis, and the scale SC3 is disposed at the intermediate position between two fixing positions of the substrate PB3 (pin holes 25 of substrate fixing units PF3 to be described later) in the circumferential direction. The scale fixing unit SF4 protrudes in the negative direction of the X axis, and the scale SC4 is disposed at the intermediate position between two fixing positions of the substrate PB4 (pin holes 25 of substrate fixing units PF4 to be described later) in the circumferential direction.

Each of the scale fixing units SF1 to SF4 is configured as a separate piece from the inner peripheral portion 7 (an example of a mounting piece). Each of the scale fixing units SF1 to SF4 includes a base 29 with a bolt hole 27 formed therein. The base 29 is attached/detached to/from a fixing portion of the inner peripheral portion 7 (e.g., a concave portion formed in the bottom surface), by a fixing bolt (not illustrated) inserted through the bolt hole 27. As a result, each of the scale fixing units SF1 to SF4 is detachably fixed to the inner peripheral portion 7. The scale fixing units SF1 to SF4 and the inner peripheral portion 7 may be configured in an integrated form. Further, the scale fixing units SF1 to SF4 may be connected to each other to form one piece.

The outer peripheral portion 5 includes a plurality of sets of substrate fixing units PF1 to PF4 (four sets in this example) that protrudes inward in the space S. The respective sets of substrate fixing units PF1 to PF4, that is, the set of substrate fixing units PF1, the set of substrate fixing units PF2, the set of substrate fixing units PF3, and the set of substrate fixing units PF4 are arranged at intervals of about 90° in the circumferential direction. The substrate fixing units PF1 are arranged such that the scale fixing unit SF1 is interposed therebetween in the circumferential direction. The substrate fixing units PF2 are arranged such that the scale fixing unit SF2 is interposed therebetween in the circumferential direction. The substrate fixing units PF3 are arranged such that the scale fixing unit SF3 is interposed therebetween in the circumferential direction. The substrate fixing units PF4 are arranged such that the scale fixing unit SF4 is interposed therebetwen in the circumferential direction. On the upper surfaces of each set of the substrate fixing units PF1 to PF4, each of the plurality of substrates PB1 to PB4 having the detection units D1 to D4, respectively, is fixed at the plurality of (two in this example) fixing positions by stud pins 31 (see, e.g., FIG. 4).

The substrate fixing units PF1 each protrude in the negative direction of the Y axis, and have the pin holes 25 (an example of a second pin hole), respectively, into which the stud pins 31 (see, e.g., FIG. 4) for fixing the substrate PB1 are press-fitted. The substrate fixing units PF1 fix the substrate PB1 such that the detection unit D1 faces the scale SC1 in the Z-axis direction at the intermediate position between the two fixing positions (the pin holes 25) of the substrate PB1 in the circumferential direction. The substrate fixing unis PF2 each protrude in the negative direction of the X axis, and have the pin holes 25, respectively, into which the stud pins 31 for fixing the substrate PB2 are press-fitted. The substrate fixing units PF2 fix the substrate PB2 such that the detection unit D2 faces the scale SC2 in the Z-axis direction at the intermediate position between the two fixing positions (the pin holes 25) of the substrate PB2 in the circumferential direction.

The substrate fixing units PF3 each protrude in the positive direction of the Y axis, and have the pin holes 25, respectively, into which the stud pins 31 for fixing the substrate PB3 are press-fitted. The substrate fixing units PF3 fix the substrate PB3 such that the detection unit D3 faces the scale SC3 in the Z-axis direction at the intermediate position between the two fixing positions (the positions corresponding to the pin holes 25) of the substrate PB3 in the circumferential direction. The substrate fixing units PF4 each protrude in the positive direction of the X axis, and have the pin holes 25, respectively, into which the stud pins 31 (see, e.g., FIG. 4) for fixing the substrate PB4 are press-fitted. The substrate fixing units PF4 fix the substrate PB4 such that the detection unit D4 faces the scale SC4 in the Z-axis direction at the intermediate position between the two fixing positions (the pin holes 25) of the substrate PB4 in the circumferential direction.

Each of the substrate fixing units PF1 to PF4 is configured as a separate piece from the outer peripheral portion 5 (an example of a mounting piece). Each of the substrate fixing units PF1 to PF4 has a base 35 with a bolt hole 33 formed therein. The base 35 is attached/detached to/from a fixing portion of the outer peripheral portion 5 (e.g., a concave portion formed in the bottom surface), by a fixing bolt (not illustrated) inserted through the bolt hole 33. As a result, each of the substrate fixing units PF1 to PF4 is detachably fixed to the outer peripheral portion 5. The substrate fixing units PF1 to PF4 and the outer peripheral portion 5 may be configured in an integrated form.

The above-described configuration of the strain body 3 is an example, and the present disclosure is not limited thereto. For example, the scale fixing units SF1 to SF4 may be provided on the outer peripheral portion 5 such that the scales SC1 to SC4 are fixed to the outer peripheral portion 5, and the substrate fixing units PF1 to PF4 may be provided on the inner peripheral portion 7 such that the detection units D1 to D4 are fixed to the inner peripheral portion 7.

(3. Configuration of Each Substrate)

Figure 4:
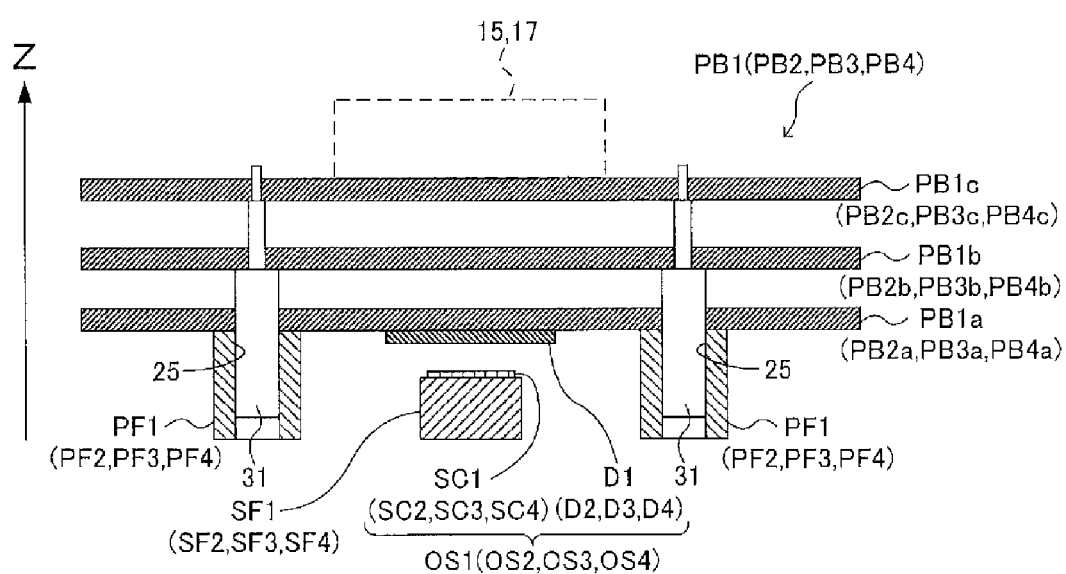
FIG. 4 is a cross-sectional view illustrating an example of a cross-sectional structure of substrates, which is taken along the IV-IV cross-sectional line of FIG. 1.

Next, an example of a configuration of each of the substrates PB1 to PB4 will be described with reference to FIG. 4. FIG. 4 is a cross-sectional view illustrating an example of the cross-sectional structure of each of the substrates PB1 to PB4, which is taken along the IV-IV cross-sectional line of FIG. 1 (also illustrated for reference in FIG. 3). FIG. 4 omits the illustration of the coupling units 19, 21, and 23 and the circuit components on each substrate.

Since the substrate configurations of the substrates PB1 to PB4 are the same, the substrate PB1 will be described here as an example. As illustrated in FIG. 4, the substrate PB1 includes a plurality of (three in this example) substrates PB1a to PB1c. The substrates PB1a to PB1c have substantially the same shape, and are arranged in multiple tiers in the Z-axis direction. The substrates PB1a to PB1c are supported by the substrate fixing units PF1 and the two stud pins 31 press-fitted into the substrate fixing units PF1, with predetermined gaps in the Z-axis direction. The substrates PB1a to PB1c are arranged in the order of the substrates PB1a, PB1b, and PB1c from the negative direction side of the Z axis toward the positive direction side thereof.

The substrate PB1a mainly performs a signal processing of an analog signal. The detection unit D1 is disposed on the lower surface of the substrate PB1a (the surface on the negative direction side of the Z axis), to face the scale SC1 fixed to the scale fixing unit SF1 with a predetermined gap in the Z axis direction. The detection unit D1 and the scale SC1 make up a first optical sensor OS1, and detect the deformation of the strain body 3. The substrate PB1a is provided with, for example, an amplifier circuit for an analog signal output from the detection unit D1 or an offset removal circuit.

The substrate PB1b mainly performs a signal processing of a digital signal. The substrate PB1b is provided with, for example, an A/D conversion circuit, an arithmetic circuit that functions as a torque calculation unit 37 to be described later, or a power supply monitoring processing circuit. The functions of these circuits may be implemented by programs executed by a CPU, or a part or all of the circuits may be implemented by actual devices such as an ASIC, an FPGA, or other electric circuits.

The substrate PB1c mainly performs a processing related to a communication function. The substrate PB1c is provided with, for example, a power supply circuit or a communication circuit for transmitting/receiving signals to/from other devices or substrates. In the substrates PB3 and PB4, the external connectors 15 and 17 described above (illustrated by the dashed lines in FIG. 4) are provided on the upper surfaces of the substrates PB3c and PB4c (the surfaces on the positive direction side of the Z axis).

Since the substrate configurations of the other substrates PB2 to PB4 are the same as that of the substrate PB1, descriptions thereof will be omitted. The scale SC2 fixed to the scale fixing unit SF2 and the detection unit D2 disposed on the substrate PB2a of the substrate PB2 make up a second optical sensor OS2. Similarly, the scale SC3 fixed to the scale fixing unit SF3 and the detection unit D3 disposed on the substrate PB3a of the substrate PB3 make up a third optical sensor OS3. Similarly, the scale SC4 fixed to the scale fixing unit SF4 and the detection unit D4 disposed on the substrate PB4a of the substrate PB4 make up a fourth optical sensor OS4.

The substrate configuration of each of the substrates PB1 to PB4 described above is an example, and the present disclosure is not limited thereto. For example, when the above-described functions of each substrate may be implemented on a single substrate, each of the substrates PB1 to PB4 may be configured with a single substrate. Further, when processings are distributed to a plurality of substrates, the distribution is not limited to the above-described example of the distribution of the analog signal processing, the digital signal processing, and the communication processing. For example, the processings may be distributed to a smaller number of substrates (e.g., two substrates), or may be distributed to a larger number of substrates (e.g., four or more substrates) by further subdividing the functions.

(4. Configuration of Detection Unit)

Figure 5:
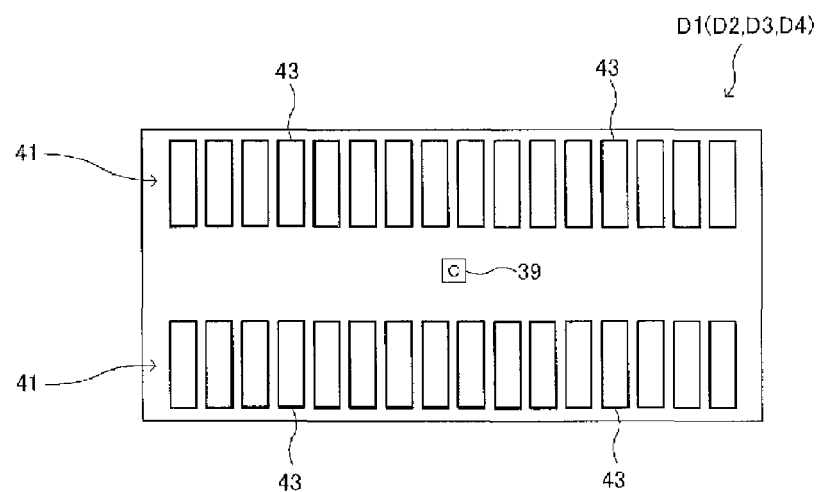
FIG. 5 is a plan view of a detection unit when viewed from the negative direction side of the Z axis.

Next, an example of a configuration of each of the detection units D1 to D4 will be described with reference to FIG. 5. FIG. 5 is a plan view of each of the detection units D1 to D4 when viewed from the negative direction side of the Z axis.

Since the detection units D1 to D4 have the same configuration, the detection unit D1 will be described here as an example. As illustrated in FIG. 5, the detection unit D1 includes a light source 39 and two light receiving units 41 arranged such that the light source 39 is interposed therebetween in the radial direction about the Z axis.

The light source 39 emits light to the scale SC1. The light source 39 is not particularly limited as long as the light source is capable of irradiating an irradiation area with light, but for example, a light emitting diode (LED) may be used. Especially, the light source 39 is configured as a point light source provided with no optical lens or the like, and emits diffused light. The "point light source" does not require a strict point, and light may be emitted from a finite emission surface as long as the light source may be regarded as emitting diffused light from a substantially point-shaped position in terms of the design or operation principle. The "diffused light" is not limited to light emitted from the point light source toward all directions, but includes light emitted and diffused toward finite specific directions. That is, the diffused light referred to here includes light having a more diffusivity than parallel light. By using the point light source described above, the light source 39 may substantially uniformly irradiate the scale SC1 disposed at the facing position. Further, since a light condensation and diffusion by an optical element is not performed, for example, an error caused from the optical element hardly occurs, so that the straightness of light to the scale SC1 may be improved.

Each light receiving unit 41 includes a plurality of (16 in this example) light receiving elements 43 arranged at equal intervals along the circumferential direction around the Z axis. That is, the plurality of light receiving elements 43 are formed to have an incremental pattern. The number of light receiving elements 43 of each light receiving unit 41 is not limited to the number described above.

In the first optical sensor OS1, the scale SC1 is irradiated with the light from the light source 39 of the detection unit D1, and each light receiving element 43 of the light receiving units 41 receives the light reflected by the scale SC1. As a result, the first optical sensor OS1 detects the relative rotation amount of the outer peripheral portion 5 and the inner peripheral portion 7, and transmits the corresponding rotation amount to the torque calculation unit 37 (see, e.g., FIG. 8).

Since the other detection units D2 to D4 have the same configuration as that of the detection unit D1 described above, descriptions thereof will be omitted. The second optical sensor OS2, the third optical sensor OS3, and the fourth optical sensor OS4 also detect the relative rotation amount of the outer peripheral portion 5 and the inner peripheral portion 7 in the same manner as described above, and transmits the corresponding rotation amount to the torque calculation unit 37 (see, e.g., FIG. 8). The torque calculation unit 37 calculates a torque value acting between the outer peripheral portion 5 and the inner peripheral portion 7, based on the rotation amounts received from the optical sensors OS1 to OS4 and, for example, elastic coefficients of the connection units 9A to 9D.

The above-described configuration of the detection unit D1 is an example, and the present disclosure is not limited thereto. For example, in the configuration described above, the two light receiving units 41 are arranged such that the light source 39 is interposed therebetween in the radial direction. However, the two light receiving units may be arranged such that the light source 39 is interposed therebetween in the circumferential direction.

(5. Fixing Structure of Substrates)

Figure 6:
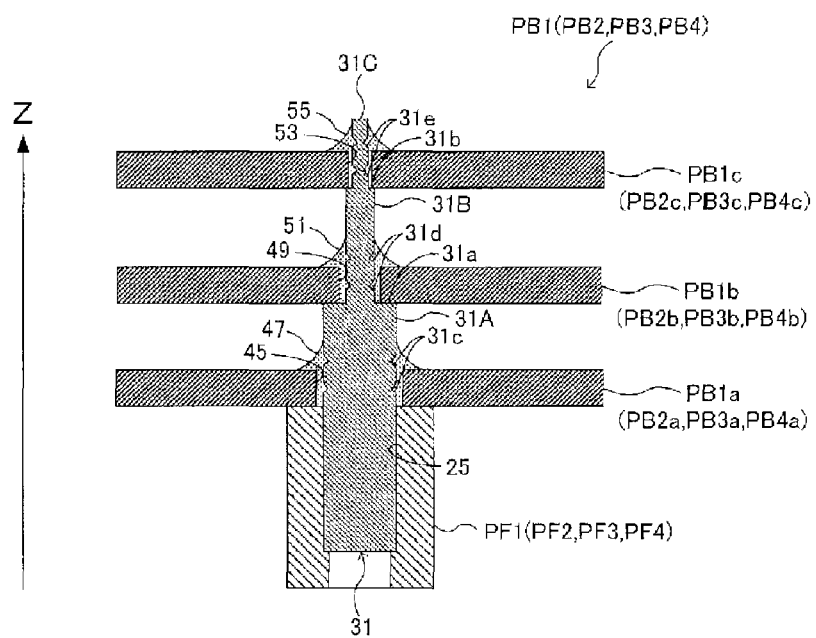
FIG. 6 is an enlarged cross-sectional view illustrating one-side portions of the substrates fixed by a stud pin.

Next, an example of a fixing structure of each of the substrates PB1 to PB4 using the stud pins 31 will be described with reference to FIG. 6. FIG. 6 is an enlarged cross-sectional view illustrating one fixed portion of each of the substrates PB1 to PB4 using each stud pin 31.

Since the substrates PB1 to PB4 have the same fixing structure, and the fixing structures at the two respective stud pins 31 are also the same, the fixing structure of the substrate PB1 by each stud pin 31 will be described here as an example. As illustrated in FIG. 4, the stud pin 31 (an example of a pin) is a columnar member having a plurality of (three in this example) portions having different diameters. The stud pin 31 has a large diameter portion 31A having the largest diameter, a medium diameter portion 31B having a medium diameter, and a small diameter portion 31C having the smallest diameter. A stepped portion 31$a$ is formed between the large diameter portion 31A and the medium diameter portion 31B, and a stepped portion 31$b$ is formed between the medium diameter portion 31B and the small diameter portion 31C.

The diameter of the large diameter portion 31A is equal to or slightly larger than the diameter of the pin hole 25 of the substrate fixing unit PF1, and the large diameter portion 31A is press-fitted into the pin hole 25. Meanwhile, a pin hole 45 (an example of a first pin hole) formed in the substrate PB1$a$ is larger than the diameter of the large diameter portion 31A by a predetermined size. In a case where the pin hole 45 and the diameter of the large diameter portion 31A are substantially the same, and the large diameter portion 31A is press-fitted into both the pin hole 45 of the substrate PB1$a$ and the pin hole 25 of the substrate fixing unit PF1, a very high dimensional accuracy may be used when the pin holes are processed in the substrate PB1$a$ and the strain body 3 (the substrate fixing unit PF1), which causes a difficulty in mass production and deteriorates the assembly workability. In the present embodiment, the pin hole 45 is formed to be larger than the diameter of the large diameter portion 31A, so that the dimensional accuracy used for processing the pin holes is lowered, thereby enabling the mass production and facilitating the assembling work.

An adhesive 47 is filled in the gap between the inner peripheral surface of the pin hole 45 and the outer peripheral surface of the large diameter portion 31A inserted through the pin hole 45. As a result, the substrate PB1$a$ may be firmly fixed to the large diameter portion 31A. In the example illustrated in FIG. 6, a padding portion (a fillet in a shape smoothly spreading downward) is formed by the adhesive 47 on the substrate PB1$a$, so as to increase the adhesion area thereby increasing the adhesive strength. Further, one or more (two in this example) grooves 31$c$ are formed at the adhering positions on the outer peripheral surface of the large diameter portion 31A. As a result, the adhesive 47 filled in the grooves 31$c$ acts as a wedge, thereby implementing an anchor effect, so that the effect of preventing the substrate PB1$a$ from shifting in the Z-axis direction may be further improved. The number of grooves 31$c$ may be one, or three or more. Further, the grooves 31$c$ may not necessarily be formed.

Similarly, the pin hole 49 (an example of the first pin hole) formed in the substrate PB1$b$ is larger than the diameter of the medium diameter portion 31B by a predetermined size. An adhesive 51 is filled in the gap between the inner peripheral surface of the pin hole 49 and the outer peripheral surface of the medium diameter portion 31B inserted through the pin hole 49. One or more (two in this example) grooves 31$d$ are formed at the adhering positions on the outer peripheral surface of the medium diameter portion 31B.

Similarly, the pin hole 53 (an example of the first pin hole) formed in the substrate PB1$c$ is larger than the diameter of the small diameter portion 31C by a predetermined size. An adhesive 55 is filled in the gap between the inner peripheral surface of the pin hole 53 and the outer peripheral surface of the small diameter portion 31C inserted through the pin hole 53. One or more (two in this example) grooves 31$e$ are formed at the adhering positions on the outer peripheral surface of the small diameter portion 31C.

In the descriptions above, the large diameter portion 31A of the stud pin 31 is press-fitted into the pin hole 25 of the substrate fixing unit PF1. However, a male screw may be formed on the outer peripheral surface of the large diameter portion 31A, and a female screw may be formed on the inner peripheral surface of the pin hole 25, such that the large diameter portion 31A may be engaged with the pin hole 25 by the screws.

Since the fixing structures of the other substrates PB2 to PB4 are the same as that of the substrate PB1 described above, descriptions thereof will be omitted.

(6. Overall Configuration of Substrates)

Figure 7:
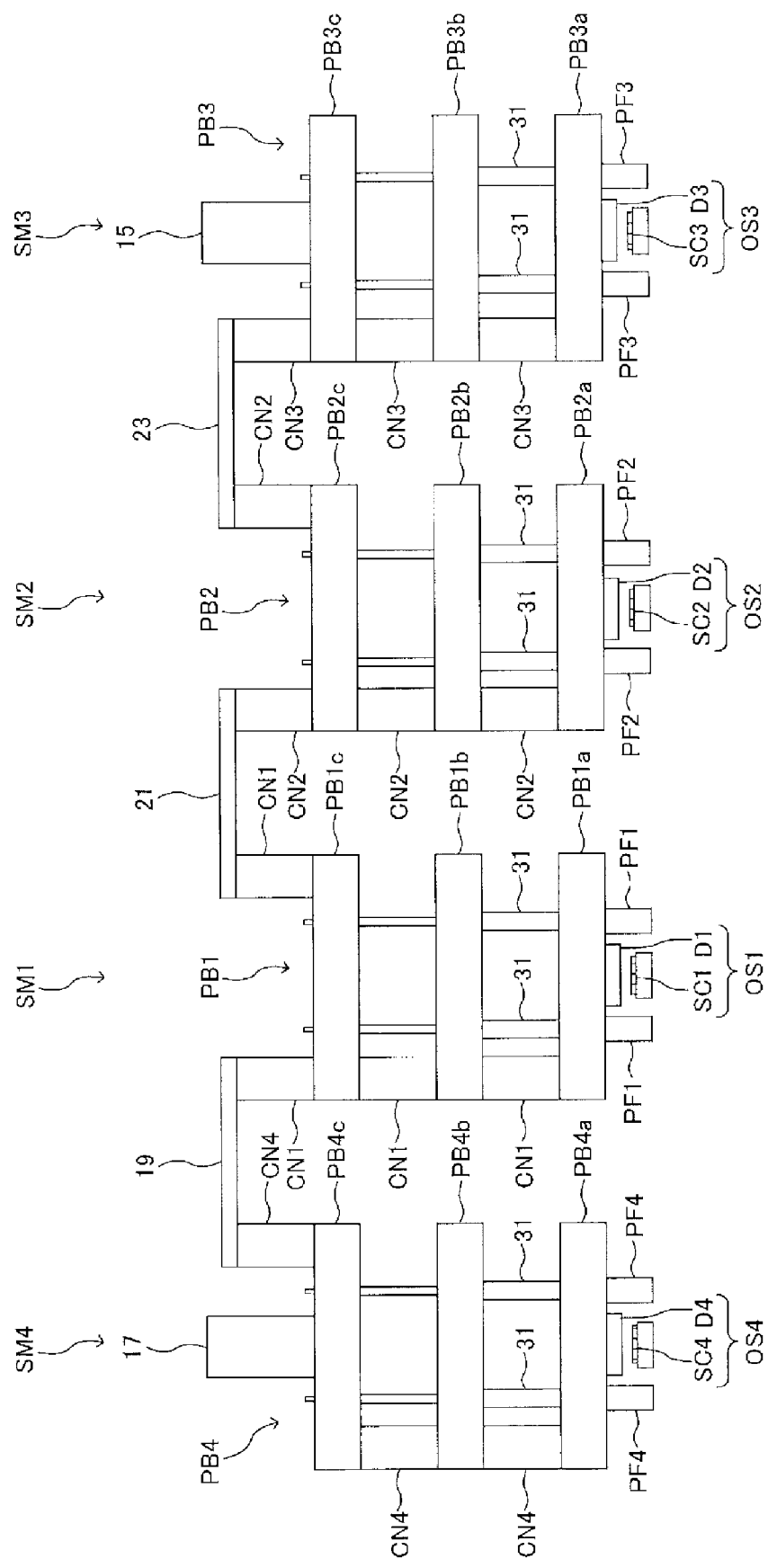
FIG. 7 is a view conceptually illustrating an example of an overall configuration of substrates of the torque sensor.

Next, an example of an overall configuration of the substrates PB1 to PB4 of the torque sensor 1 will be described with reference to FIG. 7. FIG. 7 is a view conceptually illustrating an example of the overall configuration of the substrates PB1 to PB4 of the torque sensor 1.

As illustrated in FIG. 7, the torque sensor 1 includes the four substrates PB1 to PB4. The substrates PB1a to PB1c of the substrate PB1 are connected to each other by a stacking connector CN1 so as to transmit/receive an electric power or signals. The substrates PB2a to PB2c of the substrate PB2 are connected to each other by a stacking connector CN2 so as to transmit/receive an electric power or signals. The substrates PB3a to PB3c of the substrate PB3 are connected to each other by a stacking connector CN3 so as to transmit/receive an electric power or signals. The substrates PB4a to PB4c of the substrate PB4 are connected to each other by a stacking connector CN4 so as to transmit/receive an electric power or signals.

The substrates PB4c and PB1c are connected to each other by the coupling unit 19 via the stacking connectors CN4 and CN1 so as to transmit/receive an electric power or signals. The substrates PB1c and PB2c are connected to each other by the coupling unit 21 via the stacking connectors CN1 and CN2 so as to transmit/receive an electric power or signals. The substrates PB2c and PB3c are connected to each other by the coupling unit 23 via the stacking connectors CN2 and CN3 so as to transmit/receive an electric power or signals. The substrate PB4c is provided with the external connector 17 for performing an input of a power supply or transmission/reception of signals with respect to an external device, and the substrate PB3c is provided with the external connector 17 for performing an input of a power supply or transmission/reception of signals with respect to an external device.

Here, for the convenience of descriptions, the substrate PB1 and the first optical sensor OS1 will be referred to as a first sensor module SM1, the substrate PB2 and the second optical sensor OS2 will be referred to as a second sensor module SM2, the substrate PB3 and the third optical sensor OS3 will be referred to as a third sensor module SM3, and the substrate PB4 and the fourth optical sensor OS4 will be referred to as a fourth sensor module SM4.

The first sensor module SM1 and the third sensor module SM3 arranged at an angular interval of 180° in the circumferential direction make up a first system, the third sensor module SM3 functions as a master, and the first sensor module SM1 functions as a slave. The second sensor module SM2 and the fourth sensor module SM4 arranged at an angular interval of 180° in the circumferential direction make up a second system, the fourth sensor module SM4 functions as a master, and the second sensor module SM2 functions as a slave.

In the first system, the first sensor module SM1 transmits a detection value of the first optical sensor OS1 to the third sensor module SM3 via the second sensor module SM2, and the third sensor module SM3 adds the received detection value of the first optical sensor OS1 to a detection value of the third optical sensor OS3 and calculates an average value. Similarly, in the second system, the second sensor module SM2 transmits a detection value of the second optical sensor OS2 to the fourth sensor module SM4 via the third sensor module SM3, and the fourth sensor module SM4 adds the received detection value of the second optical sensor OS2 to a detection value of the fourth optical sensor IS4 and calculates an average value. When only a cancelation of detection errors caused from the interference of other axes (which will be described in detail later) is performed, the third sensor module SM3 calculates a torque value by using the average value calculated above, and transmits the calculated torque value to the outside via the external connector 15. Further, the fourth sensor module SM4 calculates a torque value by using the average value calculated above, and transmits the calculated torque value to the outside to the external connector 17.

Meanwhile, when a cancelation of detection errors caused from a torque ripple (which will be described in detail later) is performed in a case where the torque sensor 1 is used together with a speed reducer of a wave gear mechanism, in addition to performing the cancelation of detection errors caused from the interference of other axes, for example, the following procedure is performed. That is, either the third sensor module SM3 or the fourth sensor module SM4 transmits the above-described calculated average value to the other sensor module, and the other sensor module that receives the average value adds the average values, and further calculates an average value. Then, the other sensor module calculates a torque value by using the calculated average value, and transmits the calculation result to the outside via the external connector 15 or 17.

In the descriptions above, the master of each system calculates an average value. However, the present disclosure is not limited thereto. For example, the slaves of the respective systems may calculate average values, and transmit the calculated average values to the master of one of the systems, such that the corresponding master may calculate an average of the average values to calculate a torque value. Further, for example, the master of one system may calculate an average value, and the slave of the other system may calculate an average value and transmit the calculated average value to the master of the one system, such that the corresponding master may calculate an average of the average values to calculate a torque value.

With the above-described configuration in which the transmission/reception of, for example, a signal between the master and the slave of one system is performed via the slave of the other system, the wiring may be simplified, as compared with a case where the master and the slave of each system are directly connected to each other. Further, since the third sensor module SM3 and the fourth sensor module SM4 are not connected to each other, the saving of wiring may be implemented as well.

The above-described substrate configuration is an example, and the present disclosure is not limited thereto. For example, the third sensor module SM3 and the fourth sensor module SM4 may be connected to each other by a coupling unit, such that the substrates PB1 to PB4 may be connected in an annular shape. Further, for example, the external connector may be provided in the slave of each system, instead of or in addition to the master of the system, or may be provided in at least one of the master and the slave of only either one of the systems.

(7. Torque Calculating Process)

Figure 8:
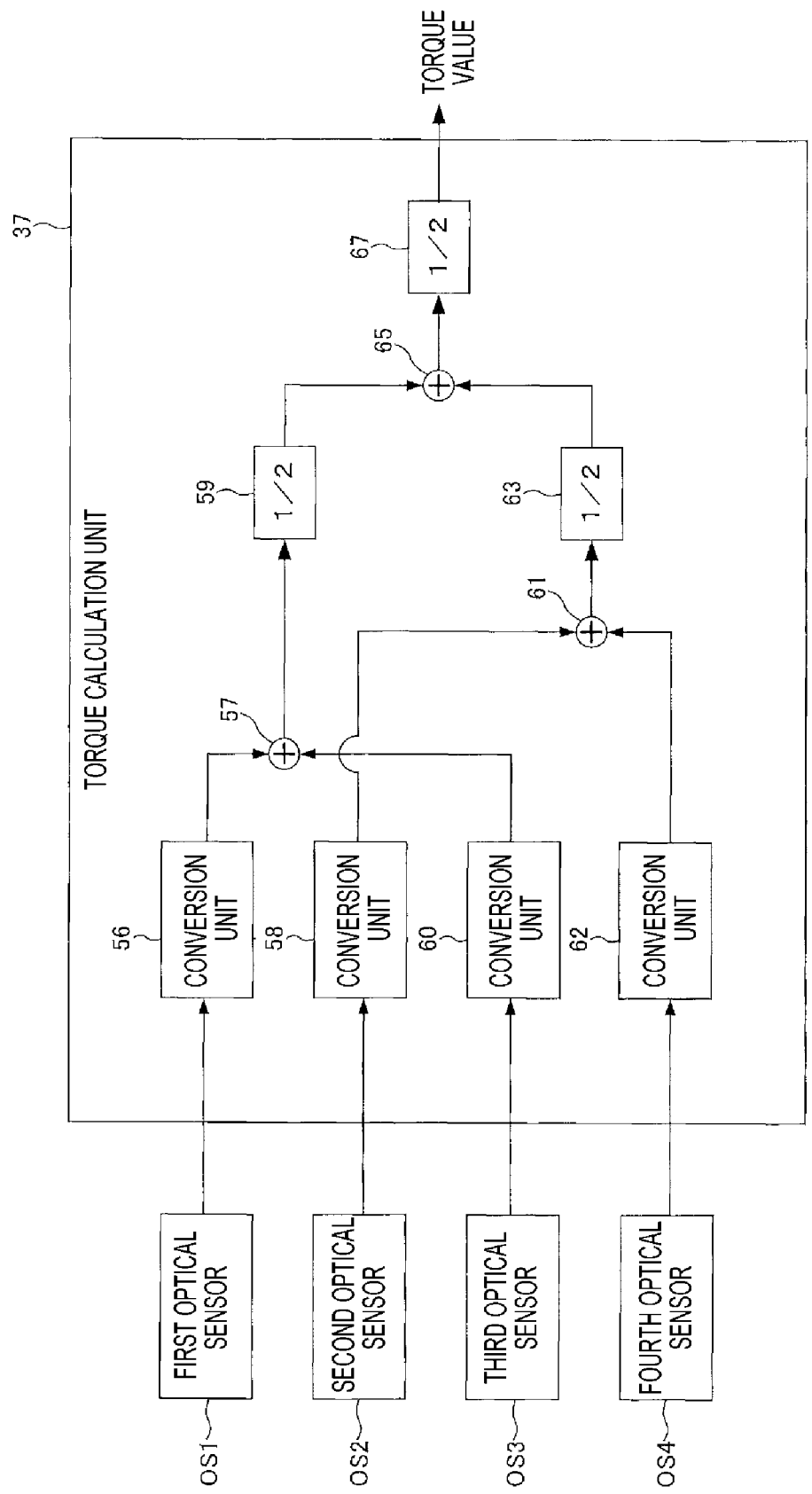
FIG. 8 is a block diagram illustrating an example of a functional configuration of a torque calculation unit that executes a torque calculating process.

Next, an example of a torque calculating process will be described with reference to FIG. 8. FIG. 8 is a block diagram illustrating an example of the functional configuration of the torque calculation unit 37 that executes the torque calculating process. The process of the torque calculation unit 37 illustrated in FIG. 8 may be distributed to all or a part (a plurality of) of the substrates PB1b, PB2b, PB3b, and PB4b, or may be executed only by a specific one substrate.

The torque calculation unit 37 calculates a torque value based on the outputs of the plurality of optical sensors (the four optical sensors OS1 to OS4 in this example). As illustrated in FIG. 8, the torque calculation unit 37 includes conversion units 56, 58, 60, and 62, an addition unit 57, a division unit 59, an addition unit 61, a division unit 63, an addition unit 65, and a division unit 67.

The conversion units 56, 58, 60, and 62 calculate torque values, respectively, which act between the outer peripheral portion 5 and the inner peripheral portion 7, based on the outputs (detection values) of the respective first optical sensor OS1, second optical sensor OS2, third optical sensor OS3, and fourth optical sensor OS4, and for example, the elastic coefficients of the connection units 9A to 9D.

The addition unit 57 adds the torque value calculated by the conversion unit 56 and the torque value calculated by the conversion unit 60. The division unit 59 divides the torque value obtained from the addition by the addition unit 57 by two, to calculate an average value.

The addition unit 61 adds the torque value calculated by the conversion unit 58 and the torque value calculated by the conversion unit 62. The division unit 63 divides the torque value obtained from the addition by the addition unit 61 by two, to calculate an average value.

In this manner, by adding the outputs of the optical sensors OS1 and OS3 (including the torque values calculated by the conversion units) arranged at the interval of 180° in the circumferential direction and adding the outputs of the optical sensors OS2 and OS4 (including the torque values calculated by the conversion units) arranged at the interval of 180° in the circumferential direction, the detection errors caused from the interference of other axes may be canceled. Here, the "interference of other axes" refers to a torsional moment Mx around the X axis, a torsional moment My around the Y axis, and translational forces Fx, Fy, and Fz in the respective X-, Y-, and Z-axis directions. In addition to the rotation around the Z axis caused by the torque to be detected (a torsional moment Mz around the Z axis), a relative rotation around the X or Y axis may occur due to external disturbance forces (the torsional moments Mx and My) other than the torque, between the outer peripheral portion 5 and the inner peripheral portion 7 of the torque sensor 1. Further, a relative movement in the X-, Y-, or Z-axis direction may occur due to external disturbance forces (the translational forces Fx, Fy, and Fz) other than the torque.

For example, when the relative rotation around the X axis occurs between the outer peripheral portion 5 and the inner peripheral portion 7, in the optical sensors OS1 and OS3 of the first system, the distances between the scales SC1 and SC3 and the detection units D1 and D3 change, but the parallel positional relationship with respect to the circumferential direction around the Z axis is maintained, so that the change of detection positions (rotation amount) in the circumferential direction around the Z axis is zero (0) or very small. Thus, the influence on the torque detection accuracy may be ignored. Meanwhile, in the optical sensors OS2 and OS4 of the second system, since an inclination occurs with respect to the circumferential direction around the Z axis between the scales SC2 and SC4 and the detection units D2 and D4, the detection positions in the circumferential direction change, which causes detection errors. However, in the respective optical sensors OS2 and OS4, the detection errors occur in the opposite directions (positive and negative directions) in the circumferential direction around the Z axis, so that by adding the outputs of the optical sensors OS2 and OS4, the detection errors caused from the torsional moment Mx may be canceled.

Similarly, when the relative rotation around the Y axis occurs between the outer peripheral portion 5 and the inner peripheral portion 7, the influence on the torque detection accuracy in the optical sensors OS2 and OS4 of the second system may be ignored. Meanwhile, in the optical sensors OS1 and OS3 of the first system, since an inclination occurs with respect to the circumferential direction around the Z axis between the scales SC1 and SC3 and the detection units D1 and D3, the detection positions in the circumferential direction change, which causes detection errors. However, in the respective optical sensors OS1 and OS3, the detection errors occur in the opposite directions (positive and negative directions) in the circumferential direction around the Z axis, so that by adding the outputs of the optical sensors OS1 and OS3, the detection errors caused from the torsional moment My may be canceled.

Further, when a relative rotation around an axis other than the X and Y axes in the XY-axis plane occurs between the outer peripheral portion 5 and the inner peripheral portion 7, in the first system, the influence on the torque detection accuracy may be ignored for the component around the X axis, and the detection errors may be canceled by adding the outputs of the optical sensors OS1 and OS3 for the component around the Y axis, as described above. In the second system, the influence on the torque detection accuracy may be ignored for the component around the Y axis, and the detection errors may be canceled by adding the outputs of the optical sensors OS2 and OS4 for the component around the X axis, as described above. Thus, even when a relative rotation occurs around an axis in any direction in the XY-axis plane, the torque sensor 1 may cancel the detection errors by adding the outputs of the optical sensors OS1 and OS3 and adding the outputs of the optical sensors OS2 and OS4.

Further, for example, when the relative movement in the X-axis direction occurs between the outer peripheral portion 5 and the inner peripheral portion 7, in the optical sensors OS2 and OS4 of the second system, the change of the detection positions (rotation amount) of the scales SC2 and SC4 and the detection units D2 and D4 in the circumferential direction around the Z axis is zero (0) or very small, so that the influence on the torque detection accuracy may be ignored. Meanwhile, in the optical sensors OS1 and OS3 of the first system, the detection positions in the circumferential direction around the Z axis change between the scales SC1 and SC3 and the detection units D1 and D3, which causes detection errors. However, in the respective optical sensors OS1 and OS3, the detection errors occur in the opposite directions (positive and negative directions) in the circumferential direction around the Z axis, so that by adding the outputs of the optical sensors OS1 and OS3, the detection errors caused from the translational force Fx may be canceled.

Similarly, when the relative movement in the Y-axis direction occurs between the outer peripheral portion 5 and the inner peripheral portion 7, in the optical sensors OS1 and OS3 of the first system, the change of the detection positions (rotation amount) of the scales SC1 and SC3 and the detection units D1 and D3 in the circumferential direction around the Z axis is zero (0) or very small, so that the influence on the torque detection accuracy may be ignored. Meanwhile, in the optical sensors OS2 and OS4 of the second system, the detection positions in the circumferential direction around the Z axis change between the scales SC2 and SC4 and the detection units D2 and D4, which causes detection errors. However, in the respective optical sensors OS2 and OS4, the detection errors occur in the opposite directions (positive and negative directions) in the circumferential direction around the Z axis, so that by adding the outputs of the optical sensors OS2 and OS4, the detection errors caused from the translational force Fy may be canceled.

Further, when a relative movement in a direction other than the X- and Y-axis directions in the XY-axis plane occurs between the outer peripheral portion 5 and the inner peripheral portion 7, in the first system, the influence on the torque detection accuracy may be ignored for the component in the Y-axis direction, and the detection errors may be canceled by adding the outputs of the optical sensors OS1 and OS3 for the component in the X-axis direction, as described above. Further, in the second system, the influence on the torque detection accuracy may be ignored for the component in the X-axis direction, and the detection errors may be canceled by adding the outputs of the optical sensors OS2 and OS4 for the component in the Y-axis direction, as described above. Thus, even when a relative movement occurs in any direction in the XY-axis plane, the torque sensor 1 may cancel the detection errors by adding the outputs of the optical sensors OS1 and OS3 and adding the outputs of the optical sensors OS2 and OS4.

Further, when the relative movement in the Z-axis direction occurs between the outer peripheral portion 5 and the inner peripheral portion 7, in all of the optical sensors OS1 to OS4, the change of the detection positions (rotation amount) of the scales SC1 to SC4 and the detection units D1 to D4 in the circumferential direction around the Z axis is zero (0) or very small, so that the influence on the torque detection accuracy may be ignored.

The addition unit 65 adds the average value obtained from the division by the division unit 59 and the average value obtained from the division by the division unit 63. In other words, the addition unit 65 adds the outputs (average values) of the first and second systems arranged to shift by 90° in the circumferential direction. The division unit 67 divides the value obtained from the addition by the addition unit 65 by two, to further calculate an average value of the average values.

As described above, by adding the outputs (average values) of the first and second systems arranged to shift by 90° in the circumferential direction, the detection errors caused from the unique torque ripple of a speed reducer provided with a wave gear mechanism may be canceled in a case where the torque sensor 1 is used together with the speed reducer. Although not illustrated, in general, the wave gear mechanism includes a circular spline, a wave generator, and a flexspline. The flexspline is flexed in an elliptical shape by the wave generator, and brought into a state where the teeth thereof mesh with those of the circular spline at the portion of long axis, and are separated from those of the circular spline at the portion of short axis. When the wave generator is turned clockwise in a state where either the circular spline or the flexspline is fixed, the flexspline is elastically deformed such that the meshing positions of teeth with the circular spline move in turn. When the wave generator rotates once, the flexspline moves counterclockwise by the difference in the number of teeth (e.g., two) between the circular spline and the flexspline in a case where the circular spline is fixed. In a case where the flexspline is fixed, the circular spline moves clockwise by the difference in the number of teeth (e.g., two).

Figure 9:
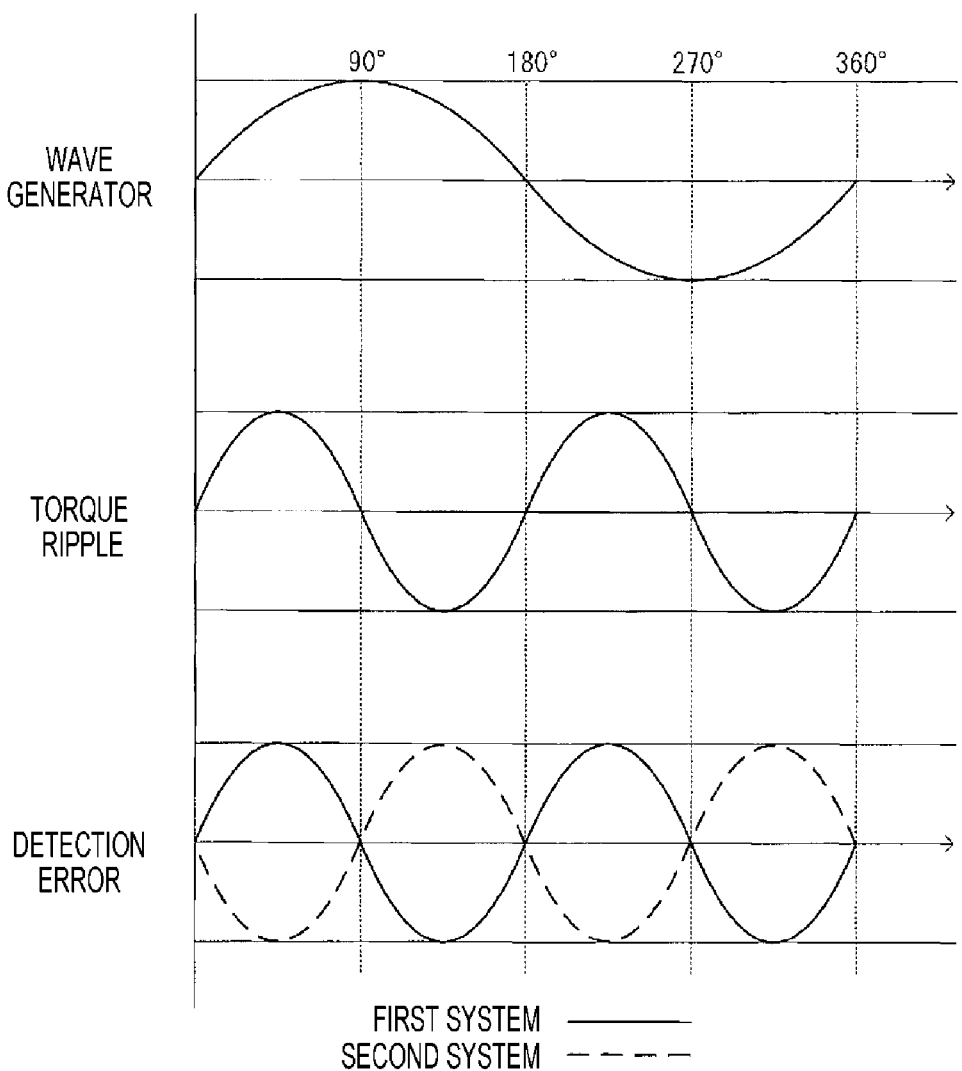
FIG. 9 is a graph for representing a cancelation of detection errors caused from a unique torque ripple of a speed reducer provided with a wave gear mechanism, by adding an output of a first system and an output of a second system.

According to the above-described configuration of the wave gear mechanism, the meshing positions of teeth between the flexspline and the circular spline pass twice during one rotation (360°) of the wave generator. As a result, as illustrated in FIG. 9, a two-cycle torque ripple is generated per rotation of the wave generator, and may appear as a detection error of the torque sensor. Since the detection error is caused from the torque ripple, the detection error has the cycle of 180°. Meanwhile, since the optical sensors OS1 and OS3 of the first system and the optical sensors OS2 and OS4 of the second system are arranged to shift by 90° in the circumferential direction, the detection errors of the outputs of the respective systems have a phase difference of 90°. Thus, by adding the output (average value) of the first system and the output (average value) of the second system, the torque sensor 1 may cancel the detection errors caused from the unique torque ripple of the speed reducer provided with the wave gear mechanism.

The torque calculating process described above is an example, and is not limited thereto. When only the cancelation of the detection errors caused from the interference of other axes is performed, such as, for example, when a speed reducer provided with no wave gear mechanism is used, the addition unit 65 and the division unit 67 may not be provided, and the average value obtained from the division by the division unit 63 and the average value obtained from the division by the division 63 may be output as independent torque values of the first and second systems, respectively. In this case, while canceling the detection errors caused from the interference of other axes, the duplicated sensor outputs may be obtained.

Further, the addition unit 57 and the division unit 59 may add the outputs of the first optical sensor OS1 and the second optical sensor OS2 (which may be the outputs of the second optical sensor OS2 and the third optical sensor OS3) arranged to shift by 90° in the circumferential direction so as to calculate an average value, and the addition unit 61 and the division unit 63 may add the outputs of the third optical sensor OS3 and the fourth optical sensor OS4 (which may be the outputs of the fourth optical sensor OS4 and the first optical sensor OS1) arranged to shift by 90° in the circumferential direction so as to calculate an average value. Then, the addition unit 65 and the division unit 67 may calculate an average value of the calculated average values. In this case as well, the detection errors caused from the interference of other axes may be canceled, and the detection errors caused from the unique torque ripple of the wave gear mechanism may also be canceled. Further, in this case, when only the cancelation of the detection errors caused from the torque ripple is performed, the addition unit 65 and the division unit 67 may not be provided, and the average value obtained from the division by the division unit 59 and the average value obtained from the division by the division unit 63 may be output as independent torque values. In this case, while canceling the detection errors caused from the torque ripple, the duplicated sensor output may be obtained.

The distribution of the processes or the like in, for example, the conversion units 56, 58, 60, and 62, the addition unit 57, the division unit 59, the addition unit 61, the division unit 63, the addition unit 65, and the division unit 67 is not limited to the example described above, and the processes may be performed by a smaller number of processing units (e.g., one processing unit) or may be performed by further subdivided processing units. Further, these functions may be implemented by, for example, programs executed by a CPU (not illustrated) provided on each of the substrates PB1*b*, PB2*b*, PB3*b*, and PB4*b*, or some or all of the functions may be implemented by actual devices such as an ASIC, an FPGA, or other electric circuits.

The optical sensors OS1 and OS3 or the optical sensors OS2 and OS4 are examples of optical sensors arranged at a predetermined angular interval other than 90° in the circumferential direction. Further, the optical sensors OS1 and OS2, the optical sensors OS2 and OS3, the optical sensors OS3 and OS4, or the optical sensors OS4 and OS1 are examples of optical sensors arranged at a predetermined angular interval other than 180° in the circumferential direction.

(8. Measure for Improving Hysteresis)

Figure 10:
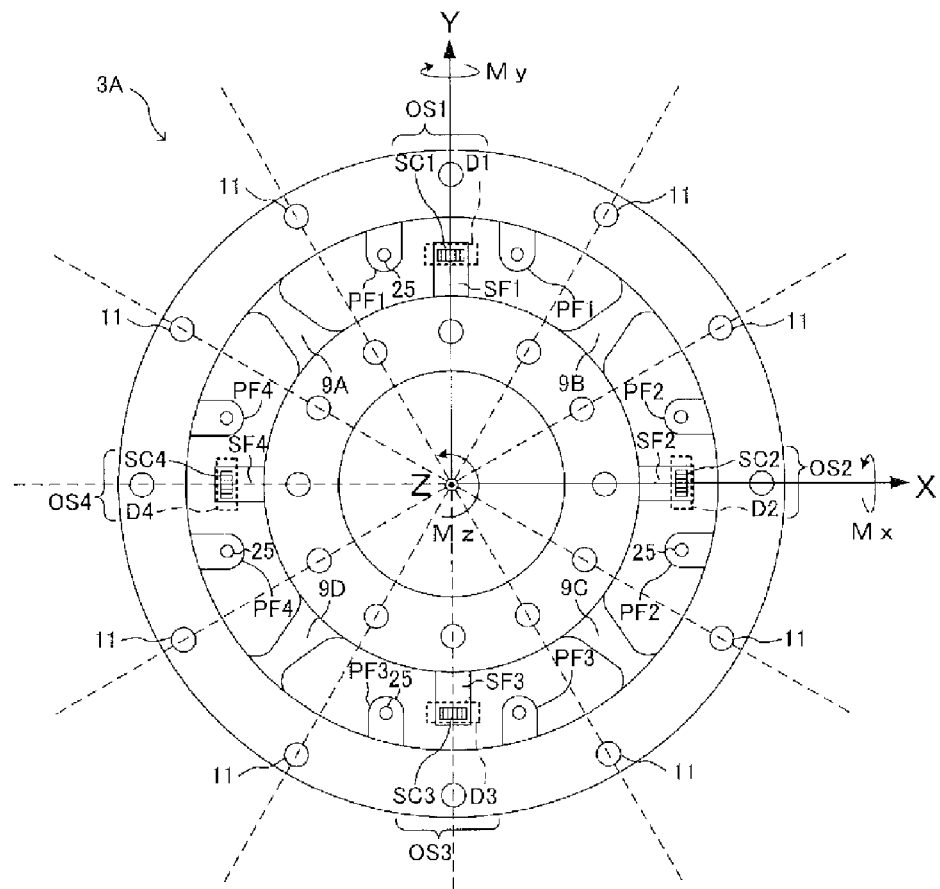
FIG. 10 is a plan view of a strain body of a torque sensor of a comparative example which does not take a measure for improving a hysteresis, when viewed from the positive direction side of the Z axis.
Figure 11:
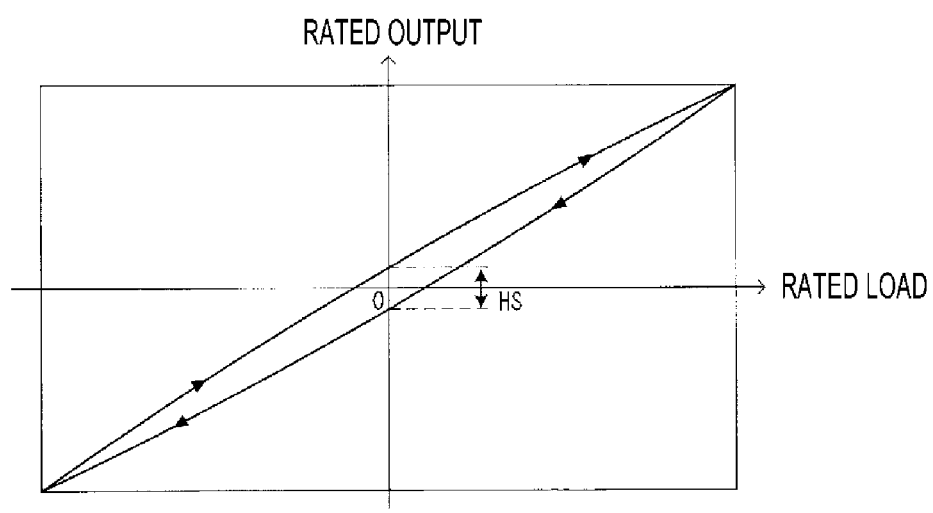
FIG. 11 is a graph illustrating an example of a hysteresis curve of a rated output with respect to a rated load in the torque sensor of the comparative example.

Next, an example of a measure for improving the hysteresis in the torque sensor 1 will be described with reference to FIGS. 10 and 11. FIG. 10 is a plan view of a strain body 3A of a torque sensor in a comparative example which takes no measure for improving the hysteresis, when viewed from the positive direction side of the Z axis. FIG. 11 is a graph illustrating an example of a hysteresis curve of a rated output with respect to a rated load in the torque sensor of the comparative example.

As illustrated in FIG. 10, in the strain body 3A of the torque sensor of the comparative example, a plurality of (12 in this example) bolt holes 11 is provided in the outer peripheral portion 5 at equal angular intervals (30° in this example) in the circumferential direction around the Z axis. Since the configuration other than the arrangement of the bolt holes 11 is the same as that of the strain body 3 illustrated in FIG. 3, descriptions thereof will be omitted.

As illustrated in FIG. 11, in the torque sensor of the comparative example in which the bolt holes 11 are arranged at equal intervals, a hysteresis HS may occur in the rated output. When the hysteresis becomes large, the hysteresis appears as a detection error of the torque sensor. As for the cause of hysteresis, it may be considered that the fastening of the outer peripheral portion 5 around the connection units 9A to 9D is insufficient, and thus, a slipping occurs between the fastening surface of the outer peripheral portion 5 and the fastening surface of an external device (e.g., a robot arm, an end effector, a speed reducer, or a motor) in the vicinity of the connection units 9A to 9D.

In the torque sensor 1 of the present embodiment, as illustrated in FIGS. 1 and 3, the bolt holes 11 are arranged intensively in the vicinity of each of the connection units 9A to 9D, so as to be denser at the position that corresponds to each of the connection units 9A to 9D in the circumferential direction around the Z axis, than those at the position that does not correspond to each of the connection units 9A to 9D. Specifically, for example, as illustrated in FIG. 3, a bolt hole 11 is disposed at the position of substantially the same angle (the position in the circumferential direction) as each of the connection units 9A to 9D, and two bolt holes 11 are disposed on both sides of the position in the circumferential direction, respectively, at intervals of, for example, about 15°. As a result, the fastening force of the outer peripheral portion 5 around the connection units 9A to 9D may be enhanced. Thus, without changing the number of fastening bolts or the bolt size, that is, without increasing the costs or size, the slipping on the fastening surface between the outer peripheral portion 5 and the member to which the outer peripheral portion 5 is fastened may be suppressed. As a result, the hysteresis may be reduced, so that the detection error may be reduced.

(9. Effects of Embodiment)

As described above, the torque sensor 1 of the present embodiment includes the strain body 3, and the optical sensors OS1 to OS4 that detect the deformation of the strain body 3. The strain body 3 includes the ring-shaped outer peripheral portion 5 and the inner peripheral portion 7 of which at least a part is disposed inside the outer peripheral portion 5 in the radial direction. The optical sensors OS1 to OS4 include the scales SC1 to SC4 fixed to the inner peripheral portion 7 and arranged between the outer peripheral portion 5 and the inner peripheral portion 7, and the detection units D1 to D4 fixed to the outer peripheral portion 5 and arranged between the outer peripheral portion 5 and the inner peripheral portion 7 while facing the scales SC1 to SC4.

As a result, the outer peripheral portion 5 and at least a part of the inner peripheral portion 7 may be arranged to overlap axially with each other, so that the axial dimension of the torque sensor 1 may be reduced. Further, since the optical sensors OS1 to OS4 are accommodated in the space S of the gap between the outer peripheral portion 5 and the inner peripheral portion 7, the optical sensors OS1 to OS4 may be suppressed from protruding (projecting) outward from the outer peripheral portion 5 or the inner peripheral portion 7. Thus, the torque sensor 1 may be downsized.

In the present embodiment, in particular, the torque sensor 1 further includes the substrates PB1 to PB4 arranged between the outer peripheral portion 5 and the inner peripheral portion 7 and provided with the detection units D1 to D4.

As a result, the substrates PB1 to PB4 having the processing circuits related to the optical sensors OS1 to OS4 may also be accommodated in the space S of the gap between the outer peripheral portion 5 and the inner peripheral portion 7, so that the torque sensor 1 may be made compact.

In the present embodiment, in particular, the strain body 3 includes the plurality of connection units 9A to 9D arranged between the outer peripheral portion 5 and the inner peripheral portion 7 to connect the outer peripheral portion 5 and the inner peripheral portion 7 to each other, and the substrates PB1 to PB4 are arranged in the spaces among the plurality of connection units 9A to 9D in the circumferential direction.

As a result, without disrupting the function of the strain body 3 (the relative rotation of the outer peripheral portion 5 and the inner peripheral portion 7 connected to each other by the connection units 9A to 9D, by an amount corresponding to the magnitude of the torque), the substrates PB1 to PB4 may be accommodated in the space S of the gap between the outer peripheral portion 5 and the inner peripheral portion 7.

In the present embodiment, in particular, the plurality of substrates PB1 to PB4 are arranged in the plurality of spaces S1 to S4, respectively, among the plurality of connection units 9A to 9D in the circumferential direction, and the torque sensor 1 further includes the coupling units 19, 21, and 23 that electrically connect the circumferentially adjacent substrates to each other, across the connection units 9A to 9D.

As a result, the plurality of spaces S1 to S4 formed by the plurality of connection units 9A to 9D between the outer peripheral portion 5 and the inner peripheral portion 7 may be effectively utilized. Furthermore, without disrupting the function of the strain body 3, signals may be transmitted/received among the plurality of substrates PB1 to PB4.

In the present embodiment, in particular, the optical sensors OS1 to OS4 are arranged at the plurality of positions of the strain body 3 in the circumferential direction, and the torque sensor 1 further includes the torque calculation unit 37 that calculates a torque based on the outputs of the plurality of optical sensors OS1 to OS4.

By using the outputs of the plurality of optical sensors OS1 to OS4 arranged in the circumferential direction, it is possible to cancel the detection errors caused from the interference of other axes such as the torsional moments Mx and My or the translational forces Fx, Fy, and Fz, or the detection errors caused from the unique torque ripple of a speed reducer provided with a wave gear mechanism when the torque sensor 1 is used together with the speed reducer. Thus, the torque detection accuracy may be improved.

In the present embodiment, in particular, the two optical sensors OS1 and OS3 (or the optical sensors OS2 and OS4) among the plurality of optical sensors OS1 to OS4 are arranged at a predetermined angular interval other than 90° in the circumferential direction. The torque calculation unit 37 calculates a torque based on the outputs of the two optical sensors OS1 and OS3 (or the optical sensors OS2 and OS4).

When the two optical sensors OS1 and OS3 (or the optical sensors OS2 and OS4) are arranged at an angular interval other than 90° in the circumferential direction, the detection errors caused from the interference of other axes such as the torsional moments Mx and My or the translational forces Fx, Fy, and Fz are superimposed on the detection values of the respective sensors with a predetermined ratio, so that by calculating a torque using the outputs, the influence of the interference of other axes may be reduced.

In the present embodiment, in particular, the two optical sensors OS1 and OS2 (or the optical sensors OS3 and OS4) among the plurality of optical sensors OS1 to OS4 are arranged at a predetermined angular interval other than 180° in the circumferential direction, and the torque calculation unit 37 calculates a torque based on the outputs of the two optical sensors OS1 and OS2 (or the optical sensors OS3 and OS4).

When the two optical sensors OS1 and OS2 (or the optical sensors OS3 and OS4) are arranged at an angular interval other than 180° in the circumferential direction, the detection errors caused from the unique torque ripple of a speed reducer provided with a wave gear mechanism, which is two cycles per rotation, are superimposed on the detection values of the respective sensor with a predetermined ratio, so that by calculating a torque using the outputs, the influence of the torque ripple of the wave gear mechanism may be reduced.

In the present embodiment, in particular, the plurality of optical sensors OS1 to OS4 are arranged at the intervals of 90° in the circumferential direction.

By using the outputs of the two optical sensors OS1 and OS3 (or the optical sensors OS2 and OS4) arranged at the interval of 180° in the circumferential direction, the influence of the interference of other axes may be reduced. Further, by using the outputs of the two optical sensors OS1 and OS2 (or the optical sensors OS3 and OS4) arranged at the interval of 90° in the circumferential direction, the influence of the unique torque ripple of the wave gear mechanism may be reduced. Thus, by using the outputs of the four optical sensors OS1 to OS4 arranged at the intervals of 90°, both the influences described above may be reduced.

In the present embodiment, in particular, the torque calculation unit 37 adds the outputs of the plurality of optical sensors OS1 to OS4, to calculate a torque based on the added outputs.

From the two optical sensors OS1 and OS3 (or the optical sensors OS2 and OS4) arranged at the interval of 180° in the circumferential direction, the detection errors caused from the interference of other axes are output with different codes (positive and negative). Further, from the two optical sensors OS1 and OS2 (or the optical sensors OS3 and OS4) arranged at the interval of 90° in the circumferential direction, the detection errors caused from the unique torque ripple of the wave gear mechanism are output with different codes. Thus, by adding the outputs of the two optical sensors, the detection errors may be canceled.

In the present embodiment, in particular, the strain body 3 includes the substrate fixing units PF1 to PF4 fixed to the outer peripheral portion 5, protruding between the outer peripheral portion 5 and the inner peripheral portion 7, and fixing the substrates PB1 to PB4 having the detection units D1 to D4, respectively, at the plurality of fixing positions (the positions corresponding to the pin holes 25). Each of the detection units D1 to D4 is disposed at the intermediate position of the plurality of fixing positions (the intermediate position between the pin holes 25) on each of the substrates PB1 to PB4.

The material of the strain body 3 is, for example, a metal such as aluminum, and the substrates PB1 to PB4 are made of, for example, resin. Thus, due to the difference in thermal expansion coefficients of the materials, a relative displacement occurs between the detection units D1 to D4 arranged on the side of the substrates PB to PB4a and the scales SC1 to SC4 arranged on the side of the strain body 3 when the temperature changes, which may cause detection errors. In the present embodiment, each of the detection units D1 to D4 is disposed at the intermediate position of the plurality of fixing positions on each of the substrates PB1 to PB4 (specifically, the positions corresponding to the pin holes 45 through which the stud pins 31 are inserted, on each of the substrates PB1a to PB4a). As a result, at the arrangement positions of the detection units D1 to D4, the substrates PB1a to PB4a receive the pulling or pushing force from the plurality of fixing positions, and the thermal expansion and contraction by the strain body 3 becomes dominant, so that the occurrence of relative displacement between the detection units D1 to D1 and the scales SC1 to SC4 may be suppressed. Thus, the detection errors may be reduced.

In the present embodiment, in particular, the torque sensor 1 further includes the stud pins 31 inserted through the pin holes 45, 49, and 53 formed in the substrates PB1 to PB4 and press-fitted into the pin holes 25 formed in the substrate fixing units PF1 to PF4, so as to fix the substrates PB1 to PB4.

The output of the torque sensor 1 may shift as the temperature cycle is repeated. As for the cause of the shift, for example, it may be considered that a slipping occurs on the fastening surfaces between the substrate fixing units PF1 to PF4 and the substrates PB1 to PB4, and a relative displacement occurs between the detection units D1 to D4 and the scales SC1 to SC4. In the present embodiment, since the substrates PB1 to PB4 are fixed to the stud pins 31 press-fitted into the pin holes 25 of the substrate fixing units PF1 to PF4, the slipping on the fastening surfaces between the substrate fixing units PF1 to PF4 and the substrates PB1 to PF4 may be suppressed. As a result, the detection errors may be reduced.

In the present embodiment, in particular, the pin hole 45 is formed to be larger than the diameter of the large diameter portion 31A of the stud pin 31, the pin hole 49 is formed to be larger than the diameter of the medium diameter portion 31B of the stud pin 31, the pin hole 53 is formed to be larger than the diameter of the small diameter portion 31C of the stud pin 31, and the gaps between the stud pin 31 and the pin holes 45, 49, and 53 are filled with the adhesives 47, 51, and 55, respectively.

In a case where the pin holes 45, 49, and 53 and the diameter of each stud pin 31 are formed to be substantially equal to each other, and the stud pins 31 are configured to be press-fitted into both the pin holes 45, 49, and 53 of the substrates PB1 to PB4 and the pin holes 25 of the substrate fixing units PF1 to PF4, a very high dimensional accuracy may be used when the pin holes are processed in the substrates PB1 to PB4 and the strain body 3, which causes a difficulty in mass production. In the present embodiment, the pin holes 45, 49, and 53 are formed to be larger than the diameter of the stud pin 31, so that the dimensional accuracy used for processing the pin holes is lowered, thereby enabling the mass production. Further, the gaps are filled with the adhesives 47, 51, and 55, so that the substrates PB1 to PB4 may be firmly fixed to the stud pins 31.

In the present embodiment, in particular, the strain body 3 includes the substrate fixing units PF1 to PF4 and the scale fixing units SF1 to SF4 which are separate bodies from the outer peripheral portion 5 and the inner peripheral portion 7, configured to be detachable from the outer peripheral portion 5 or the inner peripheral portion 7, and configured as mounting pieces to which the detection units D1 to D4 or the scales SC1 to SC4 are fixed.

When the scales SC1 to SC4 and the detection units D1 to D4 that make up the optical sensors OS1 to OS4 are arranged between the outer peripheral portion 5 and the inner peripheral portion 7 of the strain body 3, a delicate assembling work needs to be performed in the narrow space, which may deteriorate the workability and the productivity. In the present embodiment, the substrate fixing units PF1 to PF4 and the scale fixing units SF1 to SF4 to which the detection units D1 to D4 and the scales SC1 to SC4 are fixed are configured as separate pieces from the outer peripheral portion 5 and the inner peripheral portion 7, so that the assembling work may be performed outside the gap between the outer peripheral portion 5 and the inner peripheral portion 7. As a result, the workability and the productivity may be improved.

In the present embodiment, in particular, the strain body 3 includes the plurality of connection units 9A to 9D arranged between the outer peripheral portion 5 and the inner peripheral portion 7 and configured to connect the outer peripheral portion 5 and the inner peripheral portion 7 to each other. In the outer peripheral portion 5, the positions of fastening (the bolt holes 11) to a member to which the outer peripheral portion 5 is fixed (an external device) are arranged to be denser at the positions that correspond to the connection units 9A to 9D in the circumferential direction, than those at the positions that do not correspond to the connection units 9A to 9D.

In the torque sensor of the above-described comparative example in which the bolt holes 11 are arranged at equal intervals, the hysteresis of the output may be large, which may cause detection errors (see, e.g., FIG. 11). As for the cause of the large hysteresis, for example, it may be considered that the insufficient fastening around the connection units 9A to 9D causes the occurrence of slipping on the fastening surface between the outer peripheral portion 5 and an external device, and thus, the relative displacement occurs between the detection units D1 to D4 and the scales SC1 to SC4. Thus, in the present embodiment, the fastening positions (the bolt holes 11) are arranged to be relatively dense around the connection units 9A to 9D, so that the outer peripheral portion 5 and an external device are intensively fastened to each other around the connection units 9A to 9D. As a result, without changing the number of fastening bolts or the bolt size, that is, without increasing the costs or size, the slipping on the fastening surface between the outer peripheral portion 5 and an external device may be suppressed. As a result, the hysteresis may be reduced, and the detection errors may be reduced.

(10. Modifications)

The embodiment of the present disclosure is not limited to that described above, and various modifications may be made within the scope that does not deviate from the gist and the technical idea of the present disclosure. Hereinafter, the modifications will be described.

(10-1. When Three Optical Sensors are Arranged at Intervals of 120°)

In the embodiment above, the four optical sensors OS1 to OS4 are arranged at the intervals of 90°. However, three optical sensors may be arranged at intervals of 120°. Hereinafter, the details will be described with reference to FIGS. 12 to 15.

Figure 12:
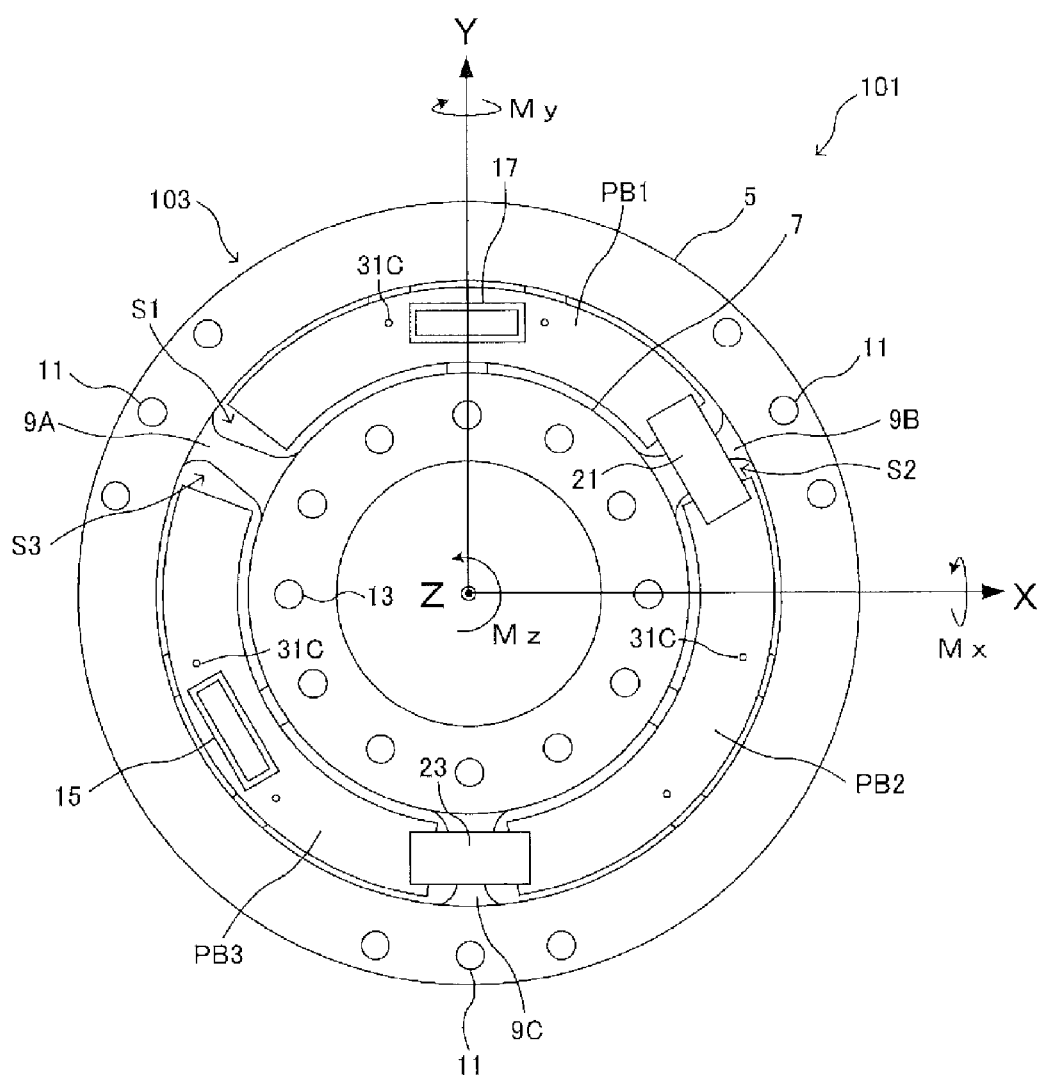
FIG. 12 is a plan view of a torque sensor when viewed from the positive direction side of the Z axis, in a modification where three optical sensors are arranged at intervals of 120°.

First, with reference to FIG. 12, an example of an overall configuration of a torque sensor 101 according to the present modification will be described. FIG. 12 is a plan view of the torque sensor 101 when viewed from the positive direction side of the Z axis.

As illustrated in FIG. 12, a strain body 103 includes a plurality of (three in this example) connection units 9A to 9C. The connection units 9A to 9C are arranged at substantially equal angular intervals (intervals of 120° in this example) in the circumferential direction around the Z axis, in the space S between the outer peripheral portion 5 and the inner peripheral portion 7. In the following, for the convenience of descriptions, in the space S, the space between the connection units 9A and 9B in the circumferential direction will be referred to as S1, the space between the connection units 9B and 9C will be referred to as S2, and the space between the connection units 9C and 9A will be referred to as S3.

A plurality of (three in this example) substrates PB1 to PB3 is arranged in the space S between the outer peripheral portion 5 and the inner peripheral portion 7. While the basic configurations of the substrates PB1 to PB3 are the same as those in the embodiment described above, the substrates PB1 to PB3 may be formed to be relatively longer in the circumferential direction to correspond to the spaces S1, S2, and S3 that become longer in the circumferential direction than those in the embodiment described above. The substrates PB1 to PB3 are arranged in the plurality of spaces S1 to S3, respectively, among the plurality of connection units 9A to 9C in the circumferential direction around the Z axis. That is, the substrate PB1 is disposed in the space S1, the substrate PB2 is disposed in the space S2, and the substrate PB3 is disposed in the space S3. The substrates PB1 and PB3 are provided with external connectors 17 and 15, respectively, for performing an input of power supply or transmission/reception of signals with respect to an external device.

The circumferentially adjacent substrates, in this example, the substrates PB1 and PB2 are electrically connected to each other by a coupling unit 21 across the connection unit 9B, and the substrates PB2 and PB3 are connected to each other by a coupling unit 23 across the connection unit 9C. Since the other configurations of the torque sensor 101 are the same as those of the torque sensor 1 according to the embodiment described above, descriptions thereof will be omitted.

Figure 13:
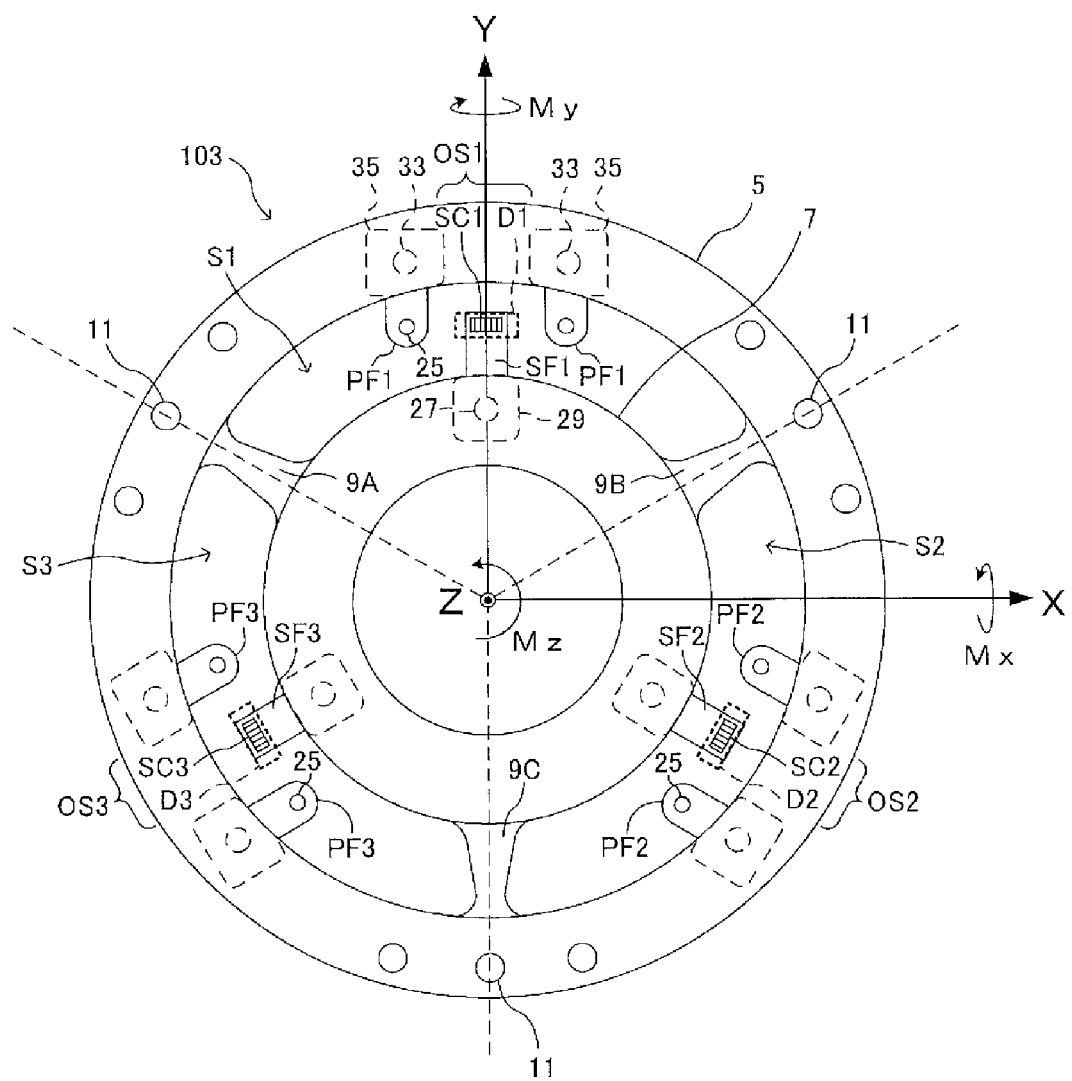
FIG. 13 is a plan view of a strain body when viewed from the positive direction side of the Z axis, in the modification where three optical sensors are arranged at intervals of 120°.

Next, an example of a configuration of the strain body 103 will be described with reference to FIG. 13. FIG. 13 is a plan view of the strain body 103 when viewed from the positive direction side of the Z axis. For preventing the complication in illustration, FIG. 13 omits the bolt holes 13 of the inner peripheral portion 7. Further, FIG. 13 indicates the detection units D1 to D3 provided on the substrates PB1 to PB3 in dashed lines in order to represent the positional relationship with the scales SC1 to SC3.

As illustrated in FIG. 13, the strain body 103 includes the outer peripheral portion 5, the inner peripheral portion 7, and the connection units 9A to 9C, and the connection units 9A to 9C are arranged at intervals of about 120° in the circumferential direction. The inner peripheral portion 7 includes a plurality of (three in this example) scale fixing units SF1 to SF3 that protrudes outward in the radial direction in the space S. The scale fixing units SF1 to SF3 are arranged at intervals of about 120° in the circumferential direction. Scales SC1 to SC3 are fixed to the upper surfaces of the scale fixing units SF1 to SF3, respectively, by, for example, screws (not illustrated).

The outer peripheral portion 5 includes a plurality of sets of substrate fixing units PF1 to PF3 (three sets in this example) that protrudes inward in the space S. The respective sets of the substrate fixing units PF1 to PF3, that is, the set of the substrate fixing units PF1, the set of the substrate fixing units PF2, and the set of the substrate fixing units PF3 are arranged at intervals of about 120° in the circumferential direction. On the upper surfaces of the respective sets of substrate fixing units PF1 to PF3, the substrates PB1 to PB3 having the detection units D1 to D3, respectively, is each fixed at a plurality of (two in this example) fixing positions by the stud pins 31. Since the other configurations of the strain body 103 are the same as those of the strain body 3 according to the embodiment described above, descriptions thereof will be omitted.

Figure 14:
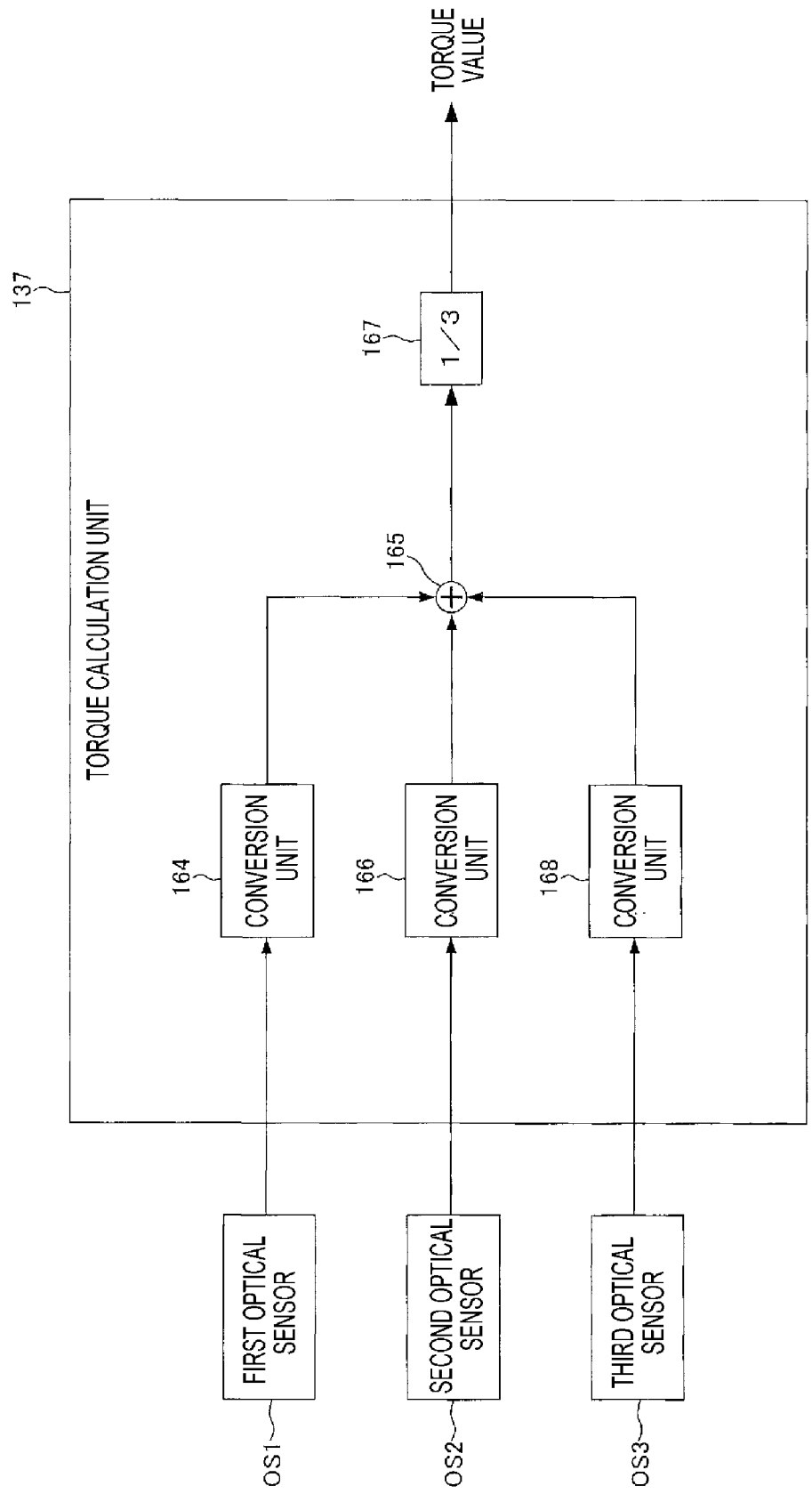
FIG. 14 is a block diagram illustrating an example of a functional configuration of a torque calculation unit that executes a torque calculating process, in the modification where three optical sensors are arranged at intervals of 120°.

Next, an example of a torque calculating process according to the present modification will be described with reference to FIG. 14. FIG. 14 is a block diagram illustrating an example of a functional configuration of a torque calculation unit 137 that executes the torque calculating process.

The torque calculation unit 137 calculates a torque value based on the outputs of the plurality of optical sensors (the three optical sensors OS1 to OS3 in this example). As illustrated in FIG. 14, the torque calculation unit 137 includes conversion units 164, 166, and 168, an addition unit 165, and a division unit 167.

The conversion units 164, 166, and 168 calculate torque values, respectively, that act between the outer peripheral portion 5 and the inner peripheral portion 7, based on the outputs (detection values) of the respective first optical sensor OS1, second optical sensor OS2, and third optical sensor OS3, and for example, the elastic coefficients of the connection units 9A to 9C. The addition unit 165 adds the torque value calculated by the conversion unit 164, the torque value calculated by the conversion unit 166, and the torque value calculated by the conversion unit 168. The division unit 167 divides the detection value obtained from the addition by the addition unit 165 by three, to calculate an average value.

In this manner, by adding the outputs of the optical sensors OS1, OS2, and OS3 (including the torque values calculated by the conversion units) arranged at the intervals of 120° in the circumferential direction, the detection errors caused from the interference of other axes may be canceled. For example, when the relative rotation around the X axis occurs between the outer peripheral portion 5 and the inner peripheral portion 7, the distance between the scale SC1 and the detection unit D1 in the optical sensor OS1 changes, but the parallel positional relationship with respect to the circumferential direction around the Z axis is maintained, so that the change (rotation amount) of the detection position in the circumferential direction around the Z axis is zero (0) or very small. Thus, the influence on the torque detection accuracy may be ignored. Meanwhile, in the optical sensors OS2 and OS3, since there is a component that causes an inclination with respect to the circumferential direction around the Z axis between the scales SC2 and SC3 and the detection units D2 and D3, the detection positions in the circumferential direction change, which causes detection errors. However, in the respective optical sensors OS2 and OS3, the detection errors occur in the opposite directions (positive and negative directions) in the circumferential direction around the Z axis. Thus, by adding the outputs of the optical sensors OS1, OS2, and OS3, the detection errors caused from the torsional moment Mx may be canceled.

Similarly, when the relative rotation around the Y axis occurs between the outer peripheral portion 5 and the inner peripheral portion 7, in the optical sensor OS1, an inclination occurs with respect to the circumferential direction around the Z axis between the scale SC1 and the detection unit D1. In the optical sensors OS2 and OS3, there is a component that causes an inclination with respect to the circumferential direction around the Z axis between the scales SC2 and SC3 and the detection units D2 and D3. Thus, in all of the optical sensors OS1 to OS3, the detection positions in the circumferential direction change, which causes detection errors. However, in the optical sensor OS1 and the optical sensors OS2, and OS3, the detection errors occur in the opposite directions (positive and negative directions) in the circumferential direction around the Z axis, so that by adding the outputs of the optical sensors OS1, OS2, and OS3, the detection errors caused from the torsional moment My may be canceled.

Further, even when a relative rotation occurs around an axis other than the X and Y axes in the XY-axis plane between the outer peripheral portion 5 and the inner peripheral portion 7, the detection errors may be canceled for both the component around the X axis and the component around the Y axis as described above, by adding the outputs of the optical sensors OS1, OS2, and OS3. Thus, by adding the outputs of the optical sensors OS1, OS2, and OS3, the torque sensor 101 may cancel the detection errors even when the relative rotation occurs around an axis in any direction in the XY axis plane.

Further, for example, when the relative movement in the X-axis direction occurs between the outer peripheral portion 5 and the inner peripheral portion 7, in the optical sensor OS1, the detection position in the circumferential direction around the Z axis changes between the scale SC1 and the detection unit D, which causes a detection error. In the optical sensors OS2 and OS3, there is a component that causes the change of detection positions in the circumferential direction around the Z axis between the scales SC2 and SC3 and the detection units D2 and D3, which causes detection errors. However, in the optical sensor OS1 and the optical sensors OS2 and OS3, the detection errors occur in the opposite directions (positive and negative directions) in the circumferential direction around the Z axis, so that by adding the outputs of the optical sensors OS1, OS2, and OS3, the detection errors caused from the torsional force Fx may be canceled.

Similarly, when the relative movement in the Y-axis direction occurs between the outer peripheral portion 5 and the inner peripheral portion 7, in the optical sensor OS1, the change of the detection position (rotation amount) of the scale SC1 and the detection unit D1 in the circumferential direction around the Z axis is zero (0) or very small, so that the influence on the torque detection accuracy may be ignored. Meanwhile, in the optical sensors OS2 and OS3, there is a component that causes the change of the detection positions in the circumferential direction around the Z axis between the scales SC2 and SC3 and the detection units D2 and D3, which causes detection errors. However, in the respective optical sensors OS2 and OS3, the detection errors occur in the opposite directions (positive and negative directions) in the circumferential direction around the Z axis, so that by adding the outputs of the optical sensors OS1, OS2, and OS3, the detection errors caused from the translational force Fy may be canceled.

Even when a relative movement in a direction other than the X- and Y-axis directions in the XY-axis plane occurs between the outer peripheral portion 5 and the inner peripheral portion 7, the detection errors may be canceled by adding the outputs of the optical sensors OS1, OS2, and OS3 for both the component in the X-axis direction and the component in the Y-axis direction, as described above. Thus, even when a relative movement occurs in any direction in the XY-axis plane, the torque sensor 101 may cancel the detection errors by adding the outputs of the respective optical sensors OS1, OS2, and OS3.

Further, in addition to canceling the detection errors caused from the interference of other axes by adding the outputs of the optical sensors OS1, OS2, and OS3 arranged at the intervals of 120° in the circumferential direction, it is possible to cancel the detection errors caused from the unique torque ripple of the speed reducer provided with the wave gear mechanism when the torque sensor 1 is used together with the speed.

Figure 15:
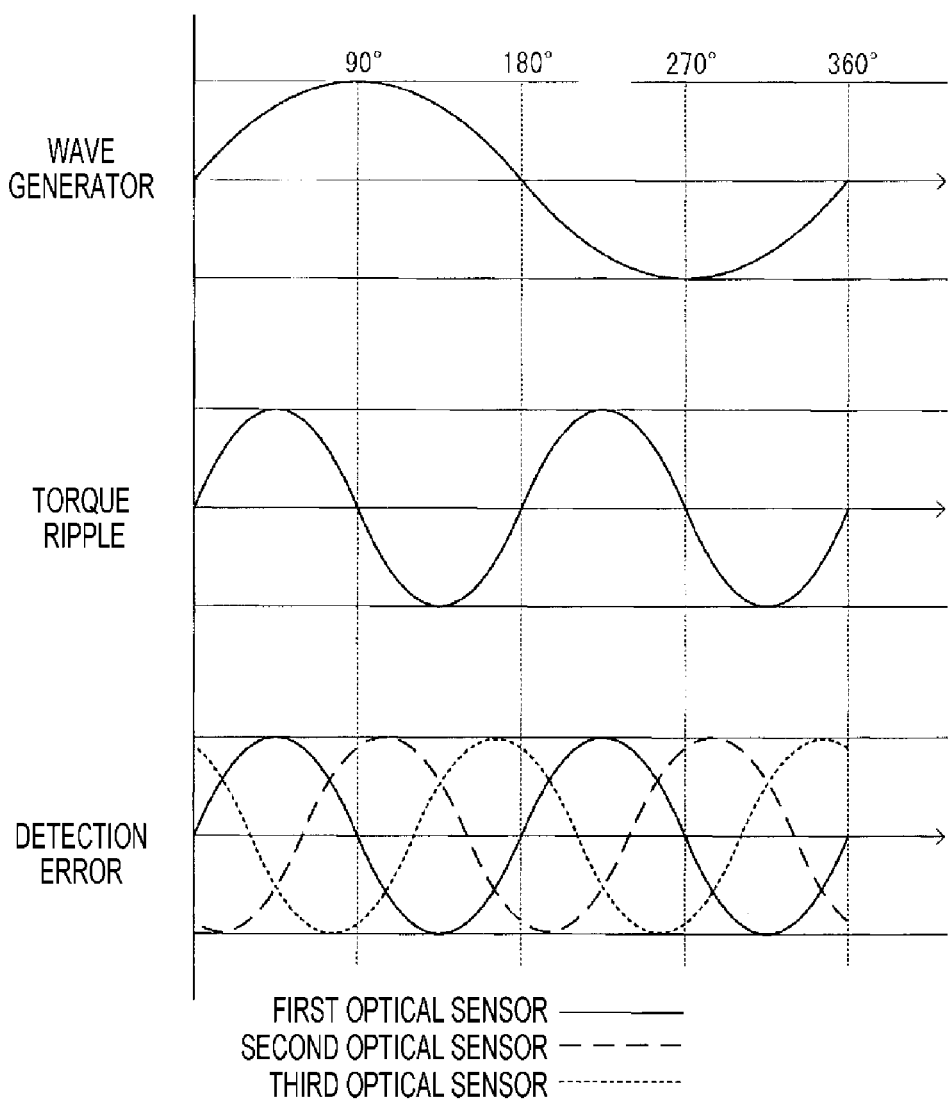
FIG. 15 is a graph for representing a cancelation of detection errors caused from a unique torque ripple of a speed reducer (e.g., a decelerator) provided with a wave gear mechanism, by adding outputs of three optical sensors, in the modification where the three optical sensors are arranged at intervals of 120°.

That is, as described above, in the wave gear mechanism, a two-cycle torque ripple is generated per rotation of the wave generator as illustrated in FIG. 15, and may appear as a detection error of the torque sensor. Since the detection error is caused from the torque ripple, the detection error has the cycle of 180°. Meanwhile, since the optical sensors OS1, OS2, and OS3 are arranged to shift by 120° in the circumferential direction, the detection errors of the outputs of the respective optical sensors have a phase difference of 120° as illustrated in FIG. 15. Thus, by adding the outputs of the optical sensors OS1, OS2, and OS3, the torque sensor 101 may cancel the detection errors caused from the unique torque ripple of the speed reducer provided with the wave gear mechanism.

In the modification above, the optical sensors OS1 and OS2, the optical sensors OS2 and OS3, or the optical sensors OS3 and OS1 are an example of optical sensors arranged at a predetermined angular interval other than 90° in the circumferential direction, and also an example of optical sensors arranged at a predetermined angle interval other than 180° in the circumferential direction.

In the torque sensor 101 of the modification described above, the three optical sensors OS1 to OS3 are arranged at the intervals of 120° in the circumferential direction. In this case, as described above, the detection errors caused from the interference of other axes and the detection errors caused from the unique torque ripple of the wave gear mechanism are superimposed on the detection values of the respective optical sensors OS1 to OS3 with a predetermined ratio. Thus, by using the outputs of the three optical sensors O51 to O53 arranged at the intervals of 120° in the circumferential direction (adding the outputs to calculate an average value), both the influence of interference of other axes and the influence of the unique torque ripple of the wave gear mechanism may be reduced.

In the modification above, the three optical sensors OS1 to OS3 arranged at the intervals of 120° in the circumferential direction are described as an example of optical sensors arranged at predetermined angular intervals other than 90° or 180° in the circumferential direction. However, the angular arrangement of the optical sensors is not limited thereto. For example, the optical sensors may be arranged at various angular intervals, such as optical sensors arranged at intervals of 60° in the circumferential direction.

(10-2. Miscellaneous)

In the descriptions above, an optical sensor is used as the sensor for detecting the deformation of the strain body 3. However, the type of the sensor is not limited thereto. For example, strain gauges may be provided on the connection units 9A to 9D. Further, a magnetic sensor may be used for detecting the relative rotation amount between the outer peripheral portion 5 and the inner peripheral portion 7. Further, instead of the scales and the detection units, electrodes facing each other may be provided, and for example, a capacitance type sensor may be used for detecting the distance between the electrodes.

(11. Example of Application of Torque Sensor)

Next, an example of an application of the torque sensor 1 (or the torque sensor 101 according to the modification) will be described with reference to FIGS. 16 to 19. Here, the torque sensor 1 will be applied to an arm of a robot.

(11-1. Configuration of Robot)

Figure 16:
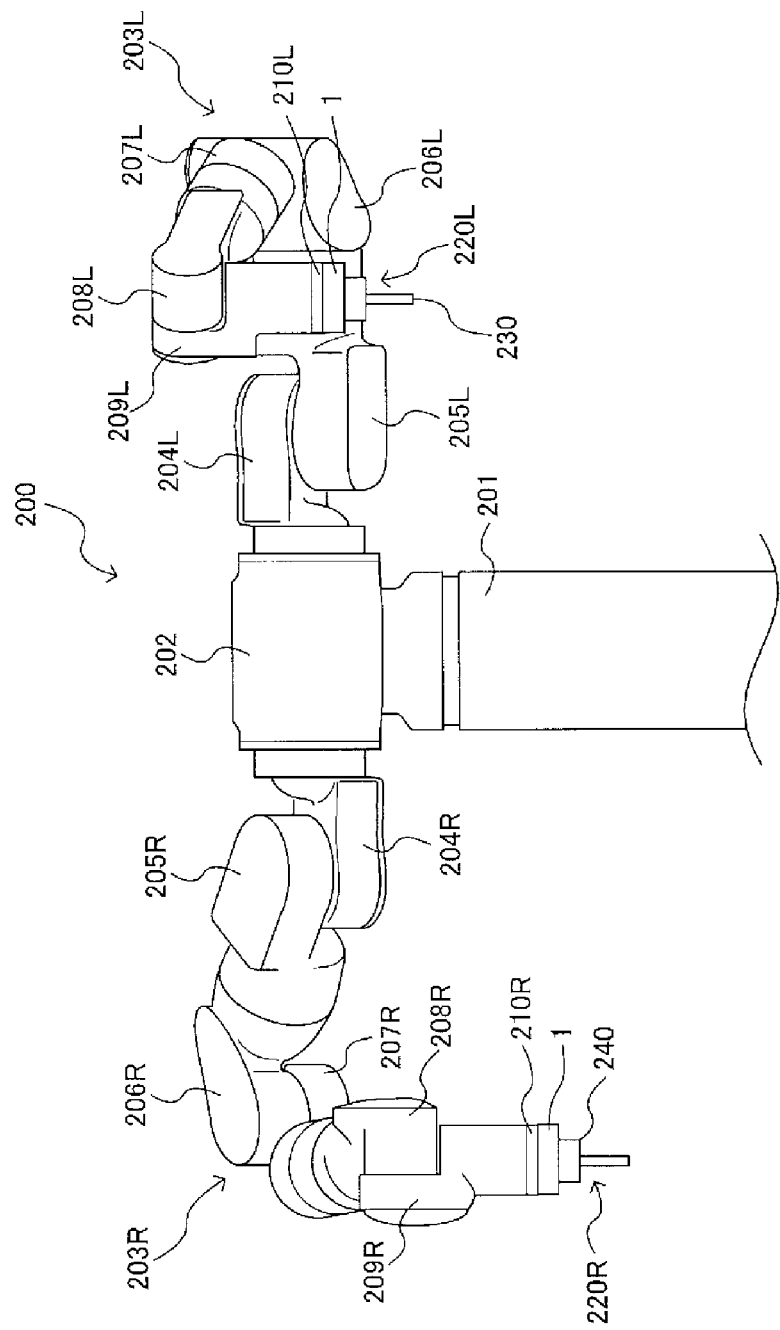
FIG. 16 is an appearance view illustrating an example of a configuration of a robot provided with a torque sensor at the tip of an arm.

With reference to FIG. 16, descriptions will be made on an example of a configuration of a robot 200 provided with the torque sensor 1 at the tip of an arm thereof. As illustrated in FIG. 16, the robot 200 is a so-called dual-arm robot that includes a base 201, a body portion 202, and two arms 203L and 203R configured as separate bodies. The robot 200 may not necessarily be the dual-arm robot, and may be a robot having only a single arm.

The base 201 is fixed to the installation surface (e.g., the bottom surface) of the robot 200 by, for example, an anchor bolt. The base 201 may be fixed to a surface other than the bottom surface (e.g., the ceiling surface or the side surface). The body portion 202 is pivotably supported on the upper end of the base 201.

The arm 203L is rotatably supported on one side of the body portion 202. The arm 203L includes a shoulder portion 204L, an upper arm A portion 205L, an upper arm B portion 206L, a lower arm portion 207L, a wrist A portion 208L, a wrist B portion 209L, and a flange portion 210L.

The shoulder portion 204L is rotatably supported on one side of the body portion 202. The shoulder portion 204L rotates with respect to one side of the body portion 202 by the driving of an actuator (not illustrated) provided at the joint portion between the shoulder portion 204L and the body portion 202.

The upper arm A portion 205L is pivotably supported on the tip of the shoulder portion 204L. The upper arm A portion 205L pivots with respect to the tip of the shoulder portion 204L by the driving of an actuator (not illustrated) provided at the joint portion between the upper arm A portion 205L and the shoulder portion 204L.

The upper arm B portion 206L is rotatably supported on the tip of the upper arm A portion 205L. The upper arm B portion 206L rotates with respect to the tip of the upper arm A portion 205L by the driving of an actuator (not illustrated) provided at the joint portion between the upper arm B portion 206L and the upper arm A portion 205L.

The lower arm portion 207L is pivotably supported on the tip of the upper arm B portion 206L. The lower arm portion 207L pivots with respect to the tip of the upper arm B portion 206L by the driving of an actuator (not illustrated) provided at the joint portion between the lower arm portion 207L and the upper arm B portion 206L.

The wrist A portion 208L is rotatably supported on the tip of the lower arm portion 207L. The wrist A portion 208L rotates with respect to the tip of the lower arm portion 207L by the driving of an actuator (not illustrated) provided at the joint portion between the wrist A portion 208L and the lower arm portion 207L.

The wrist B portion 209L is pivotably supported on the tip of the wrist A portion 208L. The wrist B portion 209L pivots with respect to the tip of the wrist A portion 208L by the driving of an actuator (not illustrated) provided at the joint portion between the wrist B portion 209L and the wrist A portion 208L.

The flange portion 210L is rotatably supported on the tip of the wrist B portion 209L. The flange portion 210L rotates with respect to the tip of the wrist B portion 209L by the driving of an actuator (not illustrated) provided at the joint portion between the flange portion 210L and the wrist B portion 209L.

A hand 220L is provided on the tip of the flange portion 210L via the torque sensor 1. The hand 220L rotates together with the rotation of the flange portion 210L via the torque sensor 1. The hand 220L includes a pair of claw members 230 movable in the direction of approaching or being away from each other.

Meanwhile, the arm 203R has a structure bilaterally symmetrical to the arm 203L, and is rotatably supported on the other side of the body portion 202. The arm 203R includes a shoulder portion 204R, an upper arm A portion 205R, an upper arm B portion 206R, a lower arm portion 207R, a wrist A portion 208R, a wrist B portion 209R, and a flange portion 210R.

The shoulder portion 204R is rotatably supported on the other side of the body portion 202. The shoulder portion 204R rotates with respect to the other side of the body portion 202 by the driving of an actuator (not illustrated) provided at the joint portion between the shoulder portion 204R and the body portion 202.

The upper arm A portion 205R is pivotably supported on the tip of the shoulder portion 204R. The upper arm A portion 205R pivots with respect to the tip of the shoulder portion 204R by the driving of an actuator (not illustrated) provided at the joint portion between the upper arm A portion 205R and the shoulder portion 204R.

The upper arm B portion 206R is rotatably supported on the tip of the upper arm A portion 205R. The upper arm B portion 206R rotates with respect to the tip of the upper arm A portion 205R by the driving of an actuator (not illustrated) provided at the joint portion between the upper arm B portion 206R and the upper arm A portion 205R.

The lower arm portion 207R is pivotably supported on the tip of the upper arm B portion 206R. The lower arm portion 207R pivots with respect to the tip of the upper arm B portion 206R by the driving of an actuator (not illustrated) provided at the joint portion between the lower arm portion 207R and the upper arm B portion 206R.

The wrist A portion 208R is rotatably supported on the tip of the lower arm portion 207R. The wrist A portion 208R rotates with respect to the tip of the lower arm portion 207R by the driving of an actuator (not illustrated) provided at the joint portion between the wrist A portion 208R and the lower arm portion 207R.

The wrist B portion 209R is pivotably supported on the tip of the wrist A portion 208R. The wrist B portion 209R pivots with respect to the tip of the wrist A portion 208R by the driving of an actuator (not illustrated) provided at the joint portion between the wrist B portion 209R and the wrist A portion 208R.

The flange portion 210R is rotatably supported on the tip of the wrist B portion 209R. The flange portion 210R rotates with respect to the tip of the wrist B portion 209R by the driving of an actuator AcR (see, e.g., FIG. 17 to be described later) provided at the joint portion between the flange portion 210R and the wrist B portion 209R.

A hand 220R is provided on the tip of the flange portion 210R via the torque sensor 1. The hand 220R rotates together with the rotation of the flange portion 210R via the torque sensor 1. The hand 220R includes a pair of claw members 240 movable in the direction of approaching or being away from each other.

Each actuator described above is configured with a servomotor provided with, for example, a speed reducer. In the descriptions above, the "rotation" and the "pivoting" discriminately refer to the rotation around the rotation axis along the longitudinal direction (or the extension direction) of the arms 203L and 203R, and the rotation around the rotation axis substantially perpendicular to the longitudinal direction (or the extension direction) of the arms 203L and 203R, respectively.

In the descriptions above, the term "perpendicular" does not indicate being strictly perpendicular, and allows tolerances and errors that may actually occur. Further, in the descriptions above, the "perpendicular" does not indicate that virtual axes intersect with each other, and includes a case of deviated positions as long as the directions of virtual axes intersect with each other.

(11-2. Assembly Configuration of Torque Sensor with Respect to Actuator)

Figure 17:
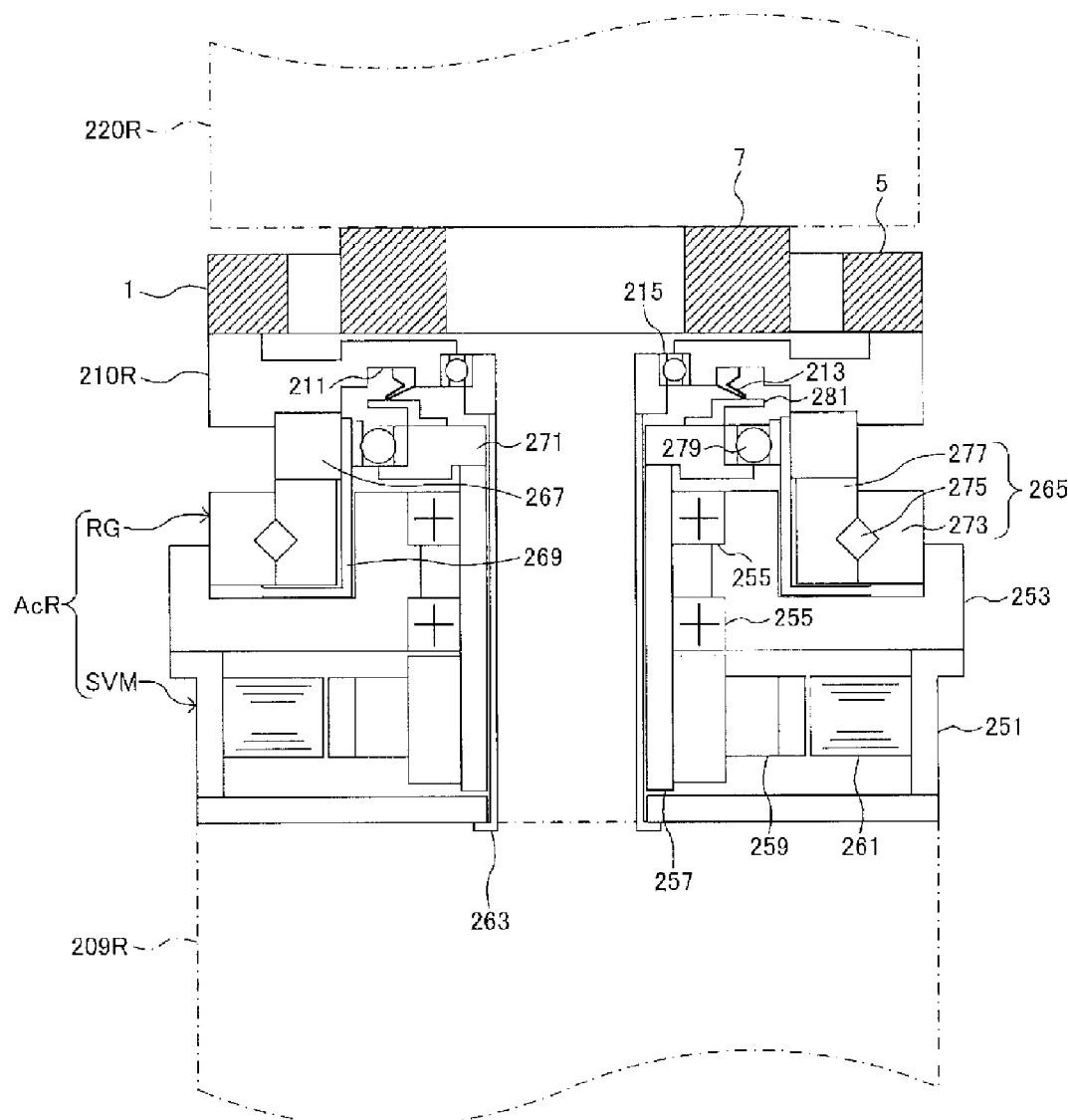
FIG. 17 is a cross-sectional view illustrating an example of a cross-sectional structure of a tip of the arm.

Next, an example of an assembly configuration of the torque sensor 1 with respect to an actuator in the robot 200 will be described with reference to FIG. 17. Since the assembly configurations at the arms 203L and 203R are the same, the assembly configuration of the torque sensor 1 with respect to the actuator AcR of the arm 203R will be described here as an example. FIG. 17 is a cross-sectional view illustrating an example of the cross-sectional structure of the tip of the arm 203R. FIG. 17 omits the illustration of the components other than the outer peripheral portion 5 and the inner peripheral portion 7 of the torque sensor 1.

As illustrated in FIG. 17, the flange portion 210R is rotatably supported on the tip of the wrist B portion 209R of the arm 203R. The flange portion 210R rotates by the driving of the actuator AcR provided at the joint portion between the flange portion 210R and the wrist B portion 209R. The hand 220R is provided on the tip of the flange portion 210R via the torque sensor 1. The hand 220R rotates together with the rotation of the flange portion 210R via the torque sensor 1.

The actuator AcR includes a servomotor SVM and a speed reducer RG. The servomotor SVM includes a motor frame 251, a bracket 253, bearings 255, a motor shaft 257, a rotor 259, and a stator 261. The motor frame 251 and the bracket 253 are fastened to each other by bolts (not illustrated), and provided on the tip of the wrist B portion 209R. For example, the two bearings 255 are provided on the inner periphery of the bracket 253, and rotatably support the hollow motor shaft 257 protruding toward the proximal end (the opposite side to the torque sensor 1). The rotor 259 is provided on the outer periphery of the motor shaft 257, and disposed to face the stator 261 provided on the inner periphery of the motor frame 251, with a gap in the radial direction. A cylindrical sleeve 263 fixed to the motor frame 251 is inserted through the motor shaft 257, and may accommodate wirings such as cables therein.

The speed reducer RG is provided with a wave gear mechanism. The reducer RG includes a slide bearing 265, a circular spline 267, a flexspline 269, and a wave generator 271. The slide bearing 265 includes an outer ring 273, a sliding body 275, and an inner ring 277. The outer ring 273 is fixed to the bracket 253 of the servomotor SVM by bolts (not illustrated), together with the flexspline 269. The inner ring 277 is fixed to the circular spline 267, and supported to be rotatable with respect to the outer ring 273 via the sliding body 275, together with the circular spline 267. The inner peripheral side of the wave generator 271 is connected to the motor shaft 257 so as to rotate together with the motor shaft 257. When the wave generator 271 (input) rotates once, the circular spline 267 (output) moves in the same rotation direction as that of the wave generator 271, by the difference in the number of teeth (e.g., two) between the circular spline 267 and the flexspline 269, since the flexspline 269 is fixed. Further, the speed reducer RG includes a bearing cover 281 that covers a bearing 279 of the wave generator 271.

The flange portion 210R is fixed to the circular spline 267 of the speed reducer RG by bolts (not illustrated). A seal groove 211 is formed in the proximal end of the flange portion 210R, and a seal member 213 is provided inside the seal groove 211 to perform a sealing by sliding on the bearing cover 281. Further, a bearing 215 is provided on the inner peripheral side of the flange portion 210R to rotatably support the sleeve 263.

The outer peripheral portion 5 of the torque sensor 1 is fastened to the flange portion 210R by a plurality of (12 in this example) fastening bolts (not illustrated) inserted through the bolt holes 11. Further, the inner peripheral portion 7 of the torque sensor 1 is fastened to the hand 220R by a plurality of (12 in this example) fastening bolts (not illustrated) inserted through the bolt holes 13.

According to the robot 200 configured as described above, the torque sensor 1 is downsized, so that it is possible to implement a robot in which the torque detection accuracy at the joint portion is improved while suppressing the increase in the longitudinal dimension of the arm. Further, when the torque detection accuracy at the joint portion is improved, an accuracy of torque control or a detection accuracy of, for example, contact with an external object may be improved, so that an application to, for example, a robot coexisting with humans may be expected.

In the descriptions above, the torque sensor 1 is provided in the actuator AcR at the tip of the arm. However, the torque sensor 1 may be provided in the actuators of the other joint portions.

(11-3. First Modification of Assembly Configuration of Torque Sensor with Respect to Actuator)

Figure 18:
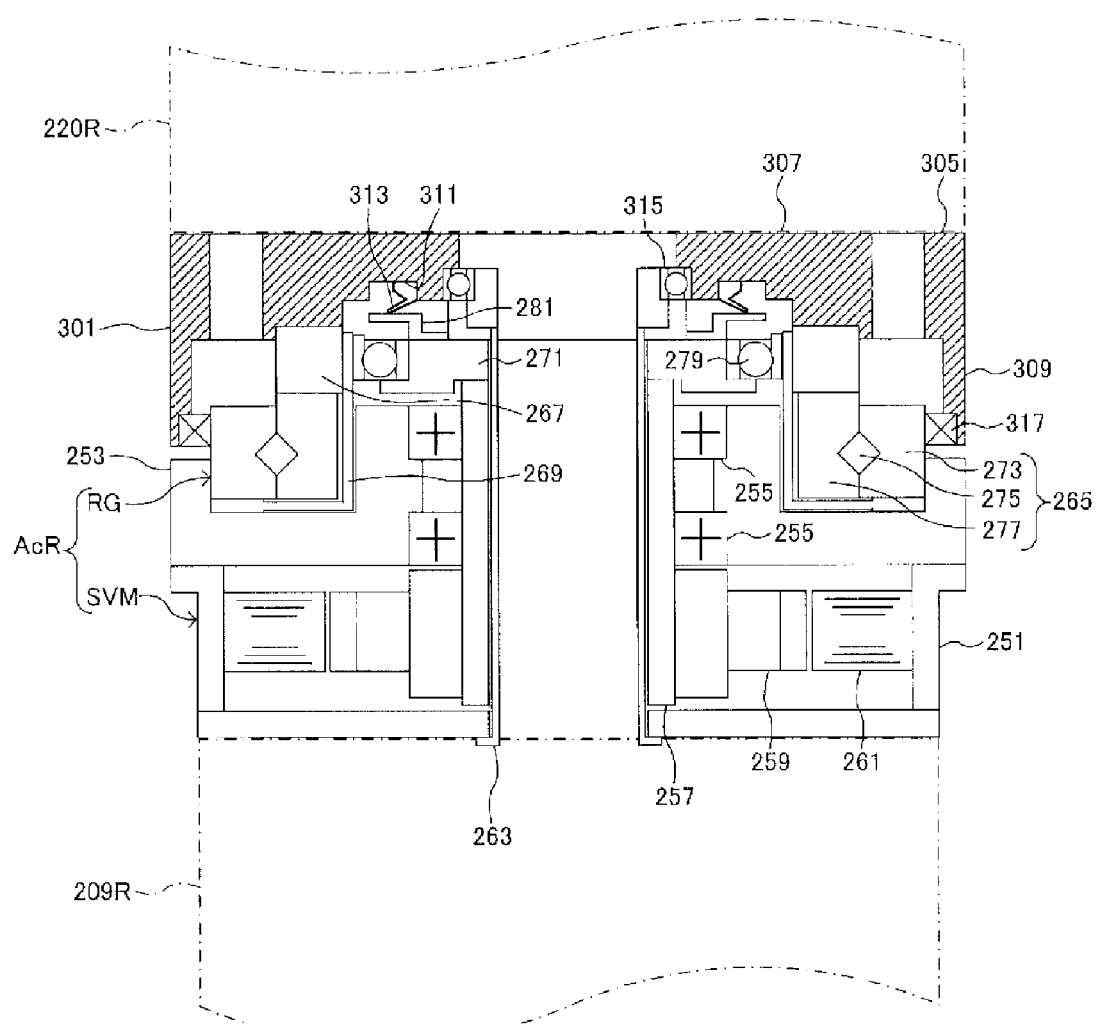
FIG. 18 is a cross-sectional view illustrating an example of a cross-sectional structure of a tip of an arm, in a first modification of an assembly configuration of a torque sensor with respect to an actuator.
Figure 19:
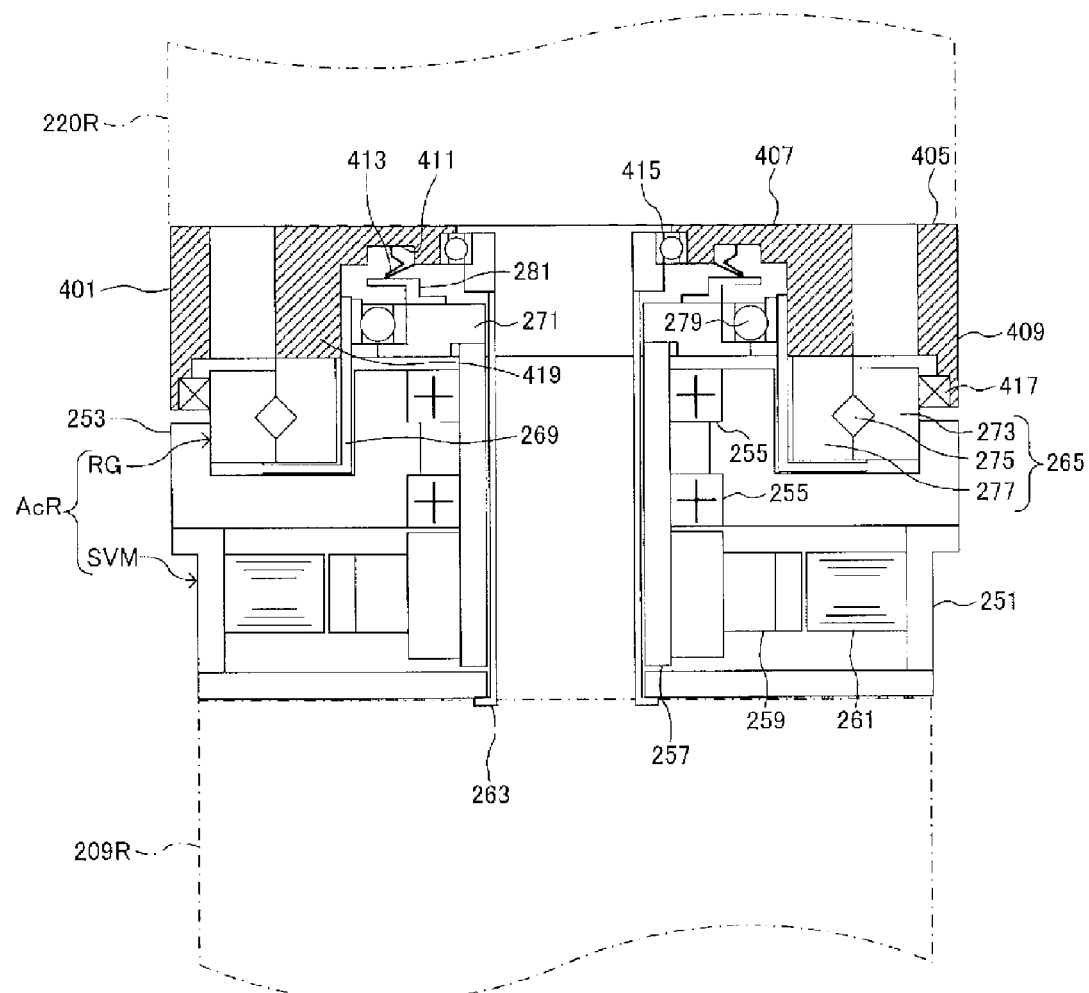
FIG. 19 is a cross-sectional view illustrating an example of a cross-sectional structure of a tip of an arm, in a second modification of the assembly configuration of a torque sensor with respect to an actuator.

In the configuration illustrated in FIG. 17, the functions of the flange portion may be assigned to the torque sensor such that the flange portion may not be used, thereby reducing the longitudinal dimension of the arm. FIG. 18 is a cross-sectional view illustrating an example of the cross-sectional structure of the tip of the arm 203R in the present first modification.

As illustrated in FIG. 18, a torque sensor 301 according to the present first modification includes an outer peripheral portion 305 and an inner peripheral portion 307. The outer peripheral portion 305 includes a cylindrical protruding portion 309 that protrudes from the end of the inner peripheral portion 307 close to the proximal end side (the opposite side to the hand 220R) toward the proximal end side. Further, the torque sensor 301 includes a seal member 317 (an example of a first seal mechanism) disposed between the protruding portion 309 and the outer ring 273 of the slide bearing 265 of the speed reducer RG (an example of a member to which the inner peripheral portion is fixed). The outer diameter of the outer peripheral portion 305 having the protruding portion 309 is formed to be substantially the same as or smaller than the outer diameter of the bracket 253. The outer peripheral portion 305 of the torque sensor 301 is fastened to the hand 220R by a plurality of (12 in this example) fastening bolts (not illustrated) inserted through the bolt holes 11.

A seal groove 311 is formed in the proximal end of the inner peripheral portion 307, and a seal member 313 (an example of a second seal mechanism) is provided inside the seal groove 311 to perform a sealing by sliding on the bearing cover 281 of the speed reducer RG. Further, a bearing 307 is provided on the inner peripheral side of the inner peripheral portion 307 to rotatably support the sleeve 263. The inner peripheral portion 307 of the torque sensor 301 is fastened to the circular spline 267 of the speed reducer RG by a plurality of (12 in this example) fastening bolts (not illustrated) inserted through the bolt holes 13.

Since, for example, the configuration of the torque sensor 301 other than the configuration described above (e.g., the strain body, the connection units, the substrates, and the optical sensors) and the contents of the torque calculating process are the same as those of the torque sensor 1 according to the embodiment described above, descriptions thereof will be omitted. Further, in the present first modification, the inner peripheral portion 307 of the torque sensor 301 is fixed to the speed reducer RG, However, the present disclosure is not limited thereto. The outer peripheral portion 305 may be fixed to the speed reducer RG, and in this case, the seal member 317 is disposed between the outer peripheral portion 305 and the outer ring 273 of the speed reducer RG to which the outer peripheral portion 305 is fixed.

According to the first modification described above, the seal member 317 provided in the torque sensor 301 may ensure the dust-proof and drip-proof properties at the outer periphery between the speed reducer RG and the torque sensor 301. Further, the sleeve 263 may be rotatably supported by the bearing 315 provided in the torque sensor 301. In this way, when the above-described functions (e.g., the seal and the bearing) of the flange portion 210R are assigned to the torque sensor 301, the flange portion 210R and the torque sensor are integrated, so that the flange portion 210R may not be used. As a result, the dimension may be reduced by the thickness of the flange portion 210R, so that the longitudinal dimension of the arm of the robot in which the torque sensor 301 is installed may be reduced. Further, the outer diameter of the torque sensor 301 may be made smaller than the outer diameter of the actuator AcR, so that the thickness of the arm does not increase. Further, since the flange portion 210R is not used, the number of components may be reduced, and further, the costs may be reduced.

In the present first modification, in particular, the torque sensor 301 further includes the seal member 313 disposed between the inner peripheral portion 307 and the speed reducer RG (the bearing cover 281) to which the inner peripheral portion 307 is fixed. As a result, the following effects are obtained. That is, when the actuator AcR and the torque sensor 301 have a hollow structure, higher dust-proof and drip-proof specifications are used, since, for example, electrical wirings and cables are accommodated inside the actuator AcR and the torque sensor 301. In the present first modification, since the seal member 313 is provided in addition to the seal member 317, the double seal structure may ensure the higher dust-proof and drip-proof properties between the speed reducer RG and the torque sensor 301.

(11-4. Second Modification of Assembly Configuration of Torque Sensor with Respect to Actuator)

In the configuration illustrated in FIG. 18, the speed reducer and the torque sensor may be integrated by incorporating the torque sensor into the speed reducer, thereby further reducing the longitudinal dimension of the arm. FIG.

19 is a cross-sectional view illustrating an example of the cross-sectional structure of the tip of the arm 203R in the present second modification.

A torque sensor 401 according to the present second modification includes an outer peripheral portion 405 and an inner peripheral portion 407. The outer peripheral portion 405 includes a cylindrical protruding portion 409 that protrudes toward the proximal end side. Further, the torque sensor 401 includes a seal member 417 (an example of a first seal mechanism) disposed between the protruding portion 409 and the outer ring 273 of the slide bearing 265 of the speed reducer RG (an example of a member to which the inner peripheral portion is fixed). The outer diameter of the outer peripheral portion 405 having the protruding portion 409 is formed to be substantially the same as or smaller than the outer diameter of the bracket 253. The outer peripheral portion 405 of the torque sensor 401 is fastened to the hand 220R by a plurality of (12 in this example) fastening bolts (not illustrated) inserted through the bolt holes 11.

The inner peripheral portion 407 includes a circular spline portion 419 formed as an internal gear having teeth on the inner peripheral surface thereof. The circular spline portion 419, and the flexspline 269 and the wave generator 271 arranged inside the circular spline portion 419 form a wave gear mechanism. Further, a seal groove 411 is formed in the proximal end of the inner peripheral portion 407, and a seal member 413 (an example of a second seal mechanism) is provided inside the seal groove 411 to perform a sealing by sliding on the bearing cover 281 of the speed reducer RG. Further, a bearing 415 is provided on the inner peripheral side of the inner peripheral portion 407 to rotatably support the sleeve 263. The inner peripheral portion 407 of the torque sensor 401 is fastened to the inner ring 277 of the slide bearing 265 of the speed reducer RG by a plurality of (12 in this examples) fastening bolts (not illustrated) inserted through the bolt holes 13.

Since, for example, the configuration of the torque sensor 401 other than the configurations described above (e.g., the strain body, the connection units, the substrates, and the optical sensors) and the contents of the torque calculating process are the same as those of the torque sensor 1 according to the embodiment described above, descriptions thereof will be omitted. Further, in the present second modification, the inner peripheral portion 407 of the torque sensor 401 is fixed to the speed reducer RG, However, the present disclosure is not limited thereto. The outper peripheral portion 405 may be fixed to the speed reducer RG, and in this case, the seal member 417 is disposed between the outer peripheral portion 405 and the outer ring 273 of the speed reducer RG to which the outer peripheral portion 405 is fixed.

According to the second modification described above, the inner peripheral portion 407 of the torque sensor 401 also serves as the circular spline of the speed reducer RG. Accordingly, it becomes possible to incorporate the torque sensor 401 into the reducer RG. As a result, the dimension may be reduced by the thickness dimension of the torque sensor 401, so that the longitudinal dimension of the arm of the robot in which the torque sensor 401 is installed may be reduced. Further, the outer diameter of the torque sensor 401 may be made smaller than the outer diameter of the actuator AcR, so that the thickness of the arm does not increase. Further, since the circular spline of the speed reducer RG is not used, the number of components may be reduced, and further, the costs may be reduced.

In the descriptions above, for example, the terms "vertical," "parallel," and "plane" do not have a strict meaning. That is, the terms "vertical," "parallel," and "plane" allow tolerances and errors in design and manufacturing, and mean "substantially vertical," "substantially parallel," and "substantially plane."

In the descriptions above, for example, the terms "similar," "same," "equal," and "different" in an external dimension or size, a shape, a position or the like do not have a strict meaning. That is, the terms "similar," "same," "equal," and "different" allow tolerances and errors in design and manufacturing, and mean "substantially similar," "substantially the same," "substantially equal," "substantially different."

According to the torque sensor of the present disclosure, a downsizing may be implemented.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A torque sensor comprising:
    a strain body; and
    an optical sensor configured to detect a deformation of the strain body,
    wherein the strain body includes
        an outer peripheral body having a ring shape, and
        an inner peripheral body of which at least a part is disposed inside the outer peripheral body in a radial direction, and
    the optical sensor includes
        a scale fixed to one of the outer peripheral body and the inner peripheral body, and disposed between the outer peripheral body and the inner peripheral body, and
        a detector fixed to a remaining one of the outer peripheral body and the inner peripheral body, and disposed to face the scale between the outer peripheral body and the inner peripheral body, and
    wherein a substrate of the torque sensor is disposed in a space formed between the outer peripheral body and the inner peripheral body, and is provided with the detector.

2. The torque sensor according to claim 1, wherein the strain body includes
    a plurality of connectors disposed between the outer peripheral body and the inner peripheral body, and configured to connect the outer peripheral body and the inner peripheral body to each other, and
    the substrate is arranged in the space among the plurality of connectors in a circumferential direction.

3. The torque sensor according to claim 2, wherein a plurality of substrates is provided in a plurality of spaces among the plurality of connectors in the circumferential direction, respectively,
    the torque sensor further comprises:
        a coupler configured to electrically connect the substrates adjacent to each other in the circumferential direction, across each of the connectors.

4. The torque sensor according to claim 1, wherein
    a plurality of optical sensors is arranged at a plurality of positions of the strain body in the circumferential direction, and
    the torque sensor further comprises:
        a torque calculator configured to calculate a torque based on outputs of the plurality of optical sensors.

5. The torque sensor according to claim 4, wherein
among the plurality of optical sensors, two optical sensors are arranged at a predetermined angular interval other than 90° in the circumferential direction, and
the torque calculator calculates the torque based on outputs of the two optical sensors.

6. The torque sensor according to claim 4, wherein
among the plurality of optical sensors, two optical sensors are arranged at a predetermined angular interval other than 180° in the circumferential direction, and
the torque calculator calculates the torque based on outputs of the two optical sensors.

7. The torque sensor according to claim 4, wherein four optical sensors are arranged in intervals of 90° in the circumferential direction.

8. The torque sensor according to claim 4, wherein three optical sensors are arranged at intervals of 120° in the circumferential direction.

9. The torque sensor according to claim 4, wherein the torque calculator adds outputs of the plurality of optical sensors, and calculates the torque based on a result of the addition.

10. The torque sensor according to claim 1, wherein
the outer peripheral body includes a protrusion that protrudes from an end of the inner peripheral body in an axial direction toward one side of the axial direction, and
the torque sensor further comprises:
a first seal disposed between the protrusion and a functional operator to which the outer peripheral body or the inner peripheral body is fixed.

11. The torque sensor according to claim 1, further comprising:
a second seal disposed between the inner peripheral body and a functional operator to which the outer peripheral body or the inner peripheral body is fixed.

12. The torque sensor according to claim 1, wherein the inner peripheral body also serves as an internal gear of a speed reducer to which the inner peripheral body is fixed.

13. The torque sensor according to claim 1, wherein
the strain body includes a plurality of substrate fixing boards fixed to the remaining one of the outer peripheral body and the inner peripheral body, protruding between the outer peripheral body and the inner peripheral body, and configured to fix each substrate having the detector at a plurality of fixing positions, and
the detector is disposed at an intermediate position between the plurality of fixing positions on each substrate.

14. The torque sensor according to claim 13, further comprising:
a pin inserted through a first pin hole formed in the substrate and press-fitted into a second pin hole formed in each of the substrate fixing boards.

15. The torque sensor according to claim 14, wherein the first pin hole is formed to be larger than a diameter of the pin, and an adhesive is filled in a gap between the pin and the first pin hole.

16. The torque sensor according to claim 1, further comprising:
a mounting piece separate from the outer peripheral body and the inner peripheral body, configured to be detachable from the outer peripheral body or the inner peripheral body, and configured to fix the detector or the scale thereto.

17. The torque sensor according to claim 1, wherein
the strain body includes a plurality of connectors arranged between the outer peripheral body and the inner peripheral body, and configured to connect the outer peripheral body and the inner peripheral body to each other, and
in the outer peripheral body, positions of fastening to a functional operator to which the outer peripheral body is fixed are arranged to be denser at positions that correspond to the connectors in the circumferential direction, than those at positions that do not correspond to the connectors.

18. A robot comprising the torque sensor according to claim 1 at a tip of an arm.

19. A robot comprising a torque sensor at a tip of an arm, wherein
the torque sensor includes
a strain body, and
a sensor configured to detect a deformation of the strain body,
the strain body includes
an outer peripheral body having a ring shape,
an inner peripheral body of which at least a part is disposed inside the outer peripheral body in a radial direction, and
a protrusion provided in the outer peripheral body, and protruding from an end of the inner peripheral body in an axial direction toward one side of the axial direction, and the torque sensor further includes
a seal disposed between the protrusion and a functional operator to which the outer peripheral body or the inner peripheral body is fixed, the functional operator including a slide bearing that is provided with an outer ring, and an inner ring rotatable with respect to the outer ring along with a sliding body disposed between the inner ring and the outer ring.

20. A torque calculation method comprising:
providing a torque sensor including
a strain body, and
a plurality of optical sensors arranged at a plurality of positions of the strain body in a circumferential direction, and configured to detect a deformation of the strain body,
wherein the strain body includes
an outer peripheral body having a ring shape, and
an inner peripheral body of which at least a part is disposed inside the outer peripheral body in a radial direction, and
wherein each of the plurality of optical sensors includes
a scale fixed to one of the outer peripheral body and the inner peripheral body, and disposed between the outer peripheral body and the inner peripheral body, and
a detector fixed to a remaining one of the outer peripheral body and the inner peripheral body, and disposed to face the scale between the outer peripheral body and the inner peripheral body, and
wherein a substrate of the torque sensor is disposed in a space formed between the outer peripheral body and the inner peripheral body, and is provided with the detector,
acquiring outputs of the plurality of optical sensors; and
adding the outputs of the plurality of optical sensors, thereby calculating a torque based on a result of the addition.

21. The torque sensor according to claim 1, wherein the substrate of the torque sensor is a flexible circuit board.

\* \* \* \* \*